(12) United States Patent
Schrader et al.

(10) Patent No.: US 11,264,869 B2
(45) Date of Patent: Mar. 1, 2022

(54) MOTOR HAVING LIMITED LEAD-END SHAFT ACCESS

(71) Applicant: Nidec Motor Corporation, St. Louis, MO (US)

(72) Inventors: John G. Schrader, St. Louis, MO (US); Steven R. Palmer, Highland, IL (US); Jeffrey Scott Sherman, Creve Coeur, MO (US)

(73) Assignee: Nidec Motor Corporation, St. Louis, MO (US)

( * ) Notice: Subject to any disclaimer, the term of this patent is extended or adjusted under 35 U.S.C. 154(b) by 135 days.

(21) Appl. No.: 16/747,346

(22) Filed: Jan. 20, 2020

(65) Prior Publication Data

US 2020/0153313 A1    May 14, 2020

Related U.S. Application Data

(63) Continuation of application No. 15/791,034, filed on Oct. 23, 2017, now Pat. No. 10,560,003.

(60) Provisional application No. 62/411,367, filed on Oct. 21, 2016.

(51) Int. Cl.

| | |
|---|---|
| *H02K 11/00* | (2016.01) |
| *H02K 11/30* | (2016.01) |
| *H02K 5/10* | (2006.01) |
| *H02K 17/30* | (2006.01) |
| *H02K 9/00* | (2006.01) |

(52) U.S. Cl.
CPC ........... *H02K 11/0094* (2013.01); *H02K 5/10* (2013.01); *H02K 9/00* (2013.01); *H02K 11/30* (2016.01); *H02K 17/30* (2013.01)

(58) Field of Classification Search
CPC ........ H02K 11/00; H02K 11/30; H02K 17/30; H02K 5/10; H02K 11/0094; H02K 9/00
See application file for complete search history.

(56) References Cited

U.S. PATENT DOCUMENTS

| | | | | |
|---|---|---|---|---|
| 3,761,748 | A * | 9/1973 | Baumann ................. | H02K 9/06 310/58 |
| 6,831,382 | B1 * | 12/2004 | Lyle ......................... | H02K 5/04 310/12.13 |
| 2004/0119352 | A1 * | 6/2004 | Long ........................ | H02K 5/10 310/89 |
| 2018/0115223 | A1 * | 4/2018 | Schrader .................. | H02K 5/10 |

\* cited by examiner

*Primary Examiner* — Naishadh N Desai
(74) *Attorney, Agent, or Firm* — Hovey Williams LLP

(57) ABSTRACT

A motor includes a shaft presenting a shaft lead end, a switch assembly including a switch arm shiftable between a first position and a second position, and shield structure. The shaft lead end and the switch assembly are disposed axially outward of an endshield. The shield structure is disposed axially outward of the switch arm to at least substantially restrict direct tool access to the switch arm from an axially outward position relative to the switch arm. The shield structure at least in part defines first and second tool access channels each extending radially inwardly to the shaft lead end, such that the shield structure enables direct tool access to the shaft lead end via the tool access channels but prevents or at least substantially restricts direct tool access to the switch arm via the tool access channels.

24 Claims, 21 Drawing Sheets

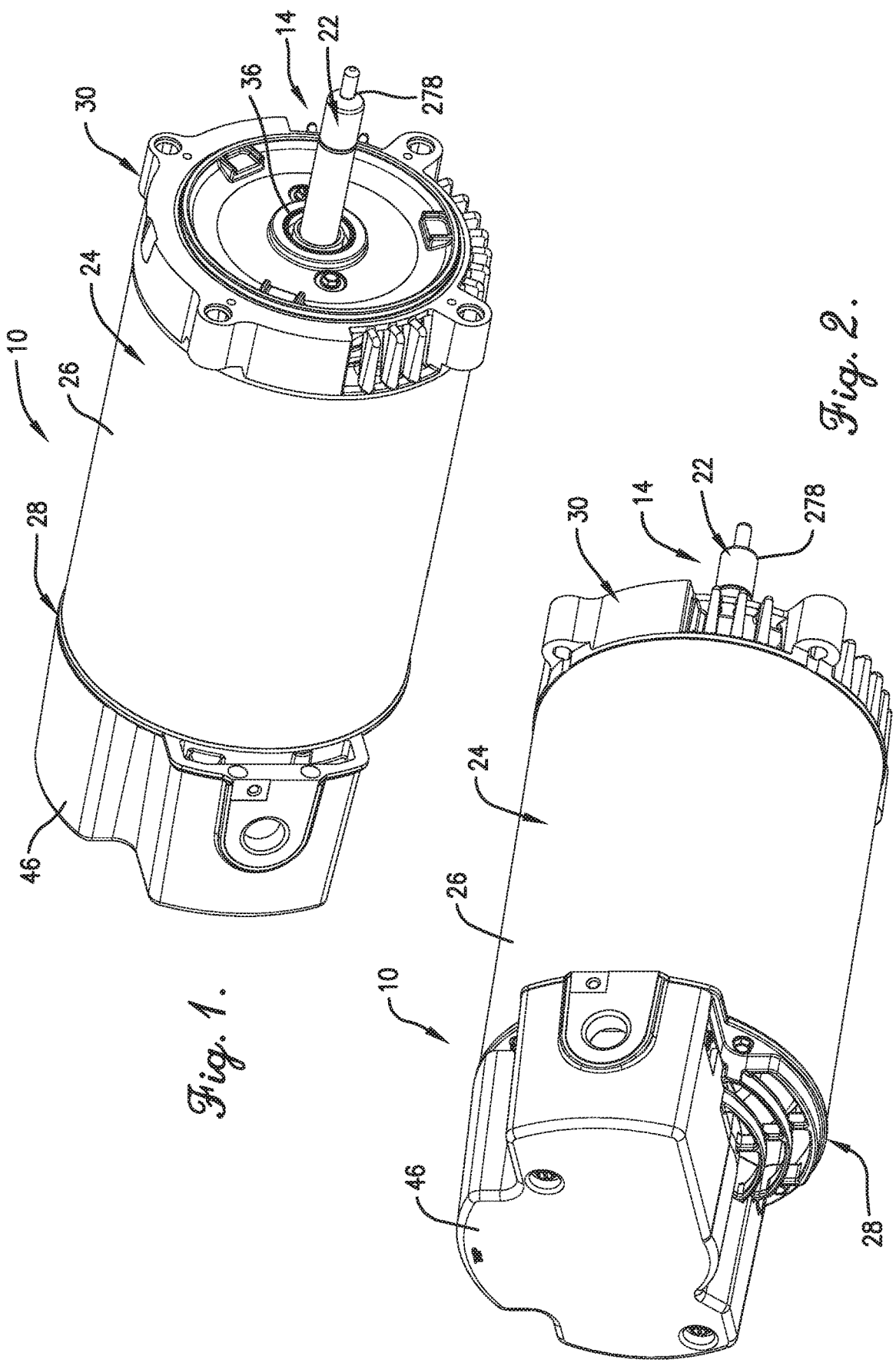

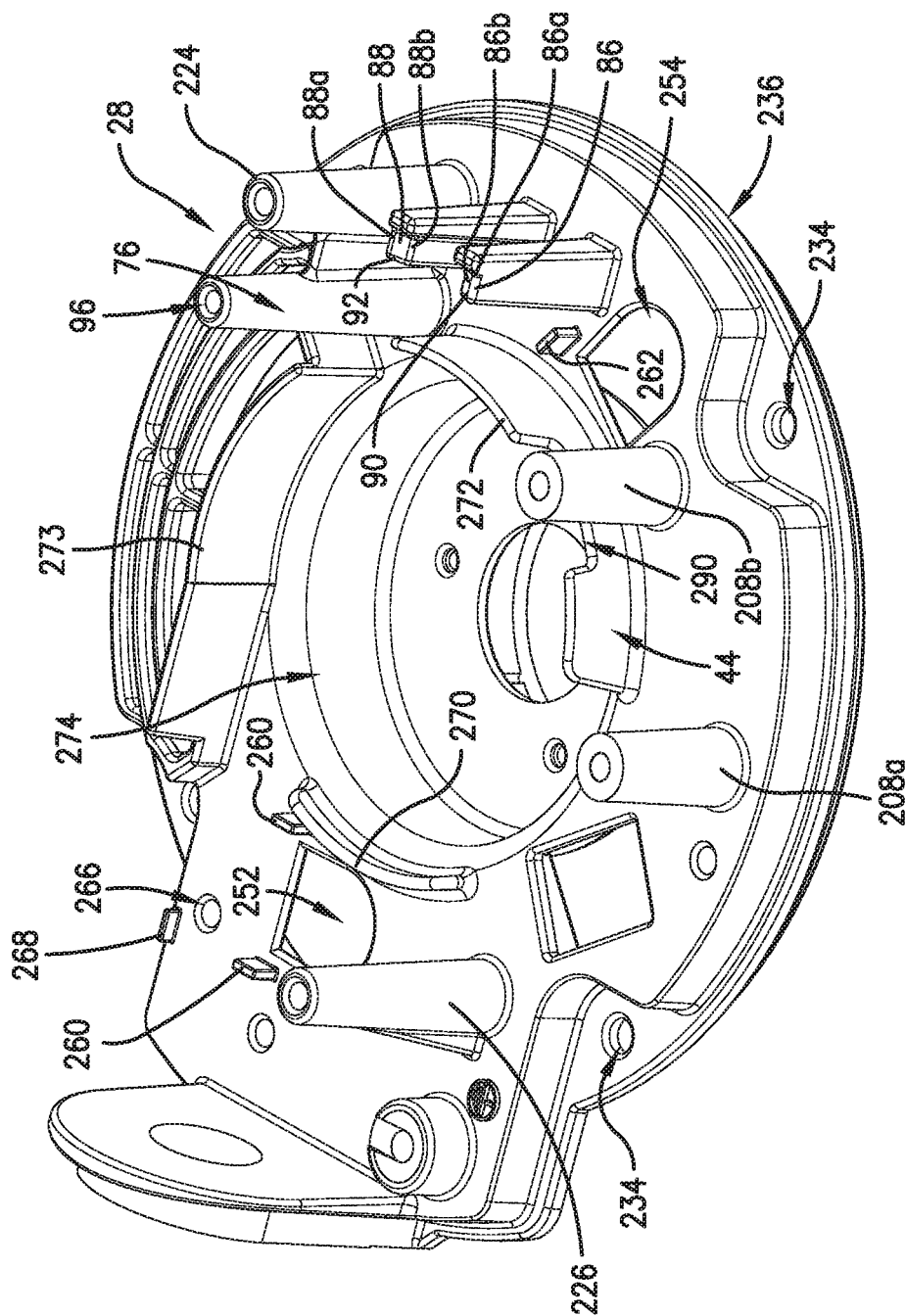

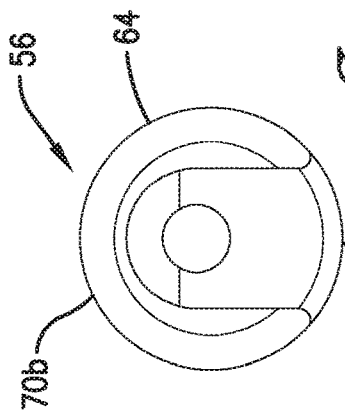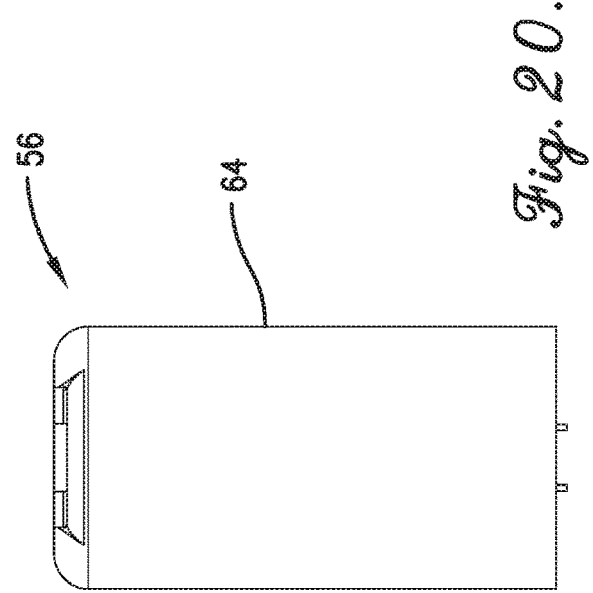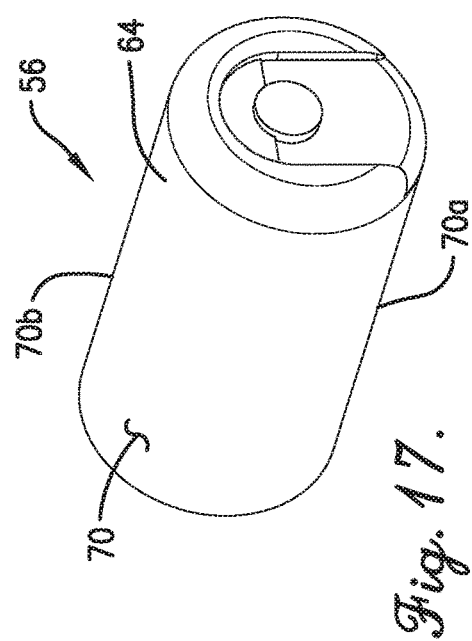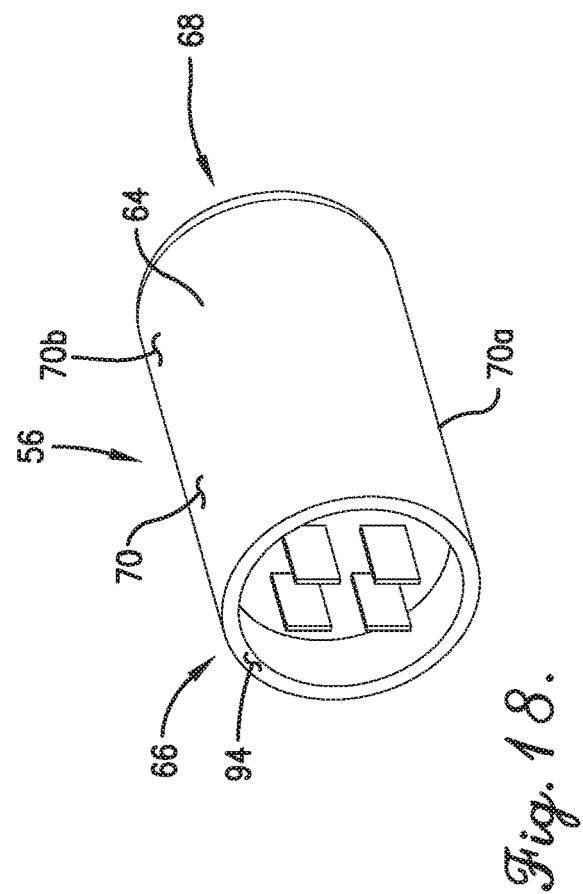

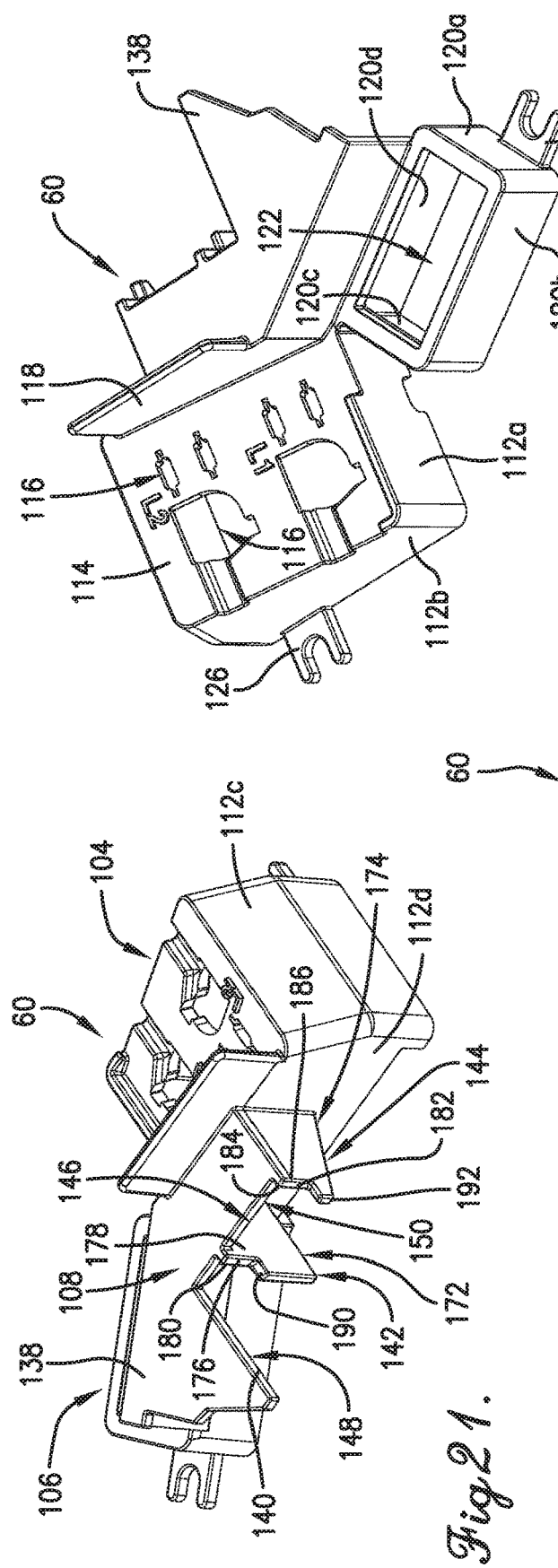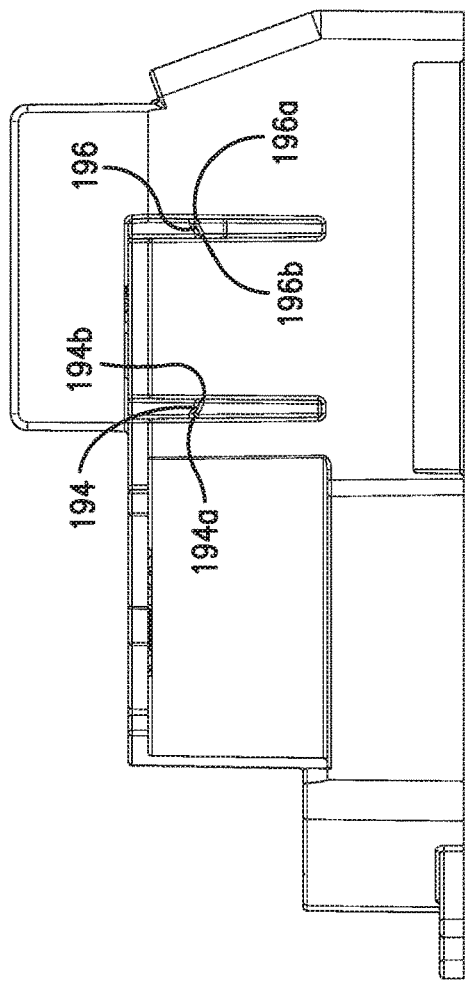

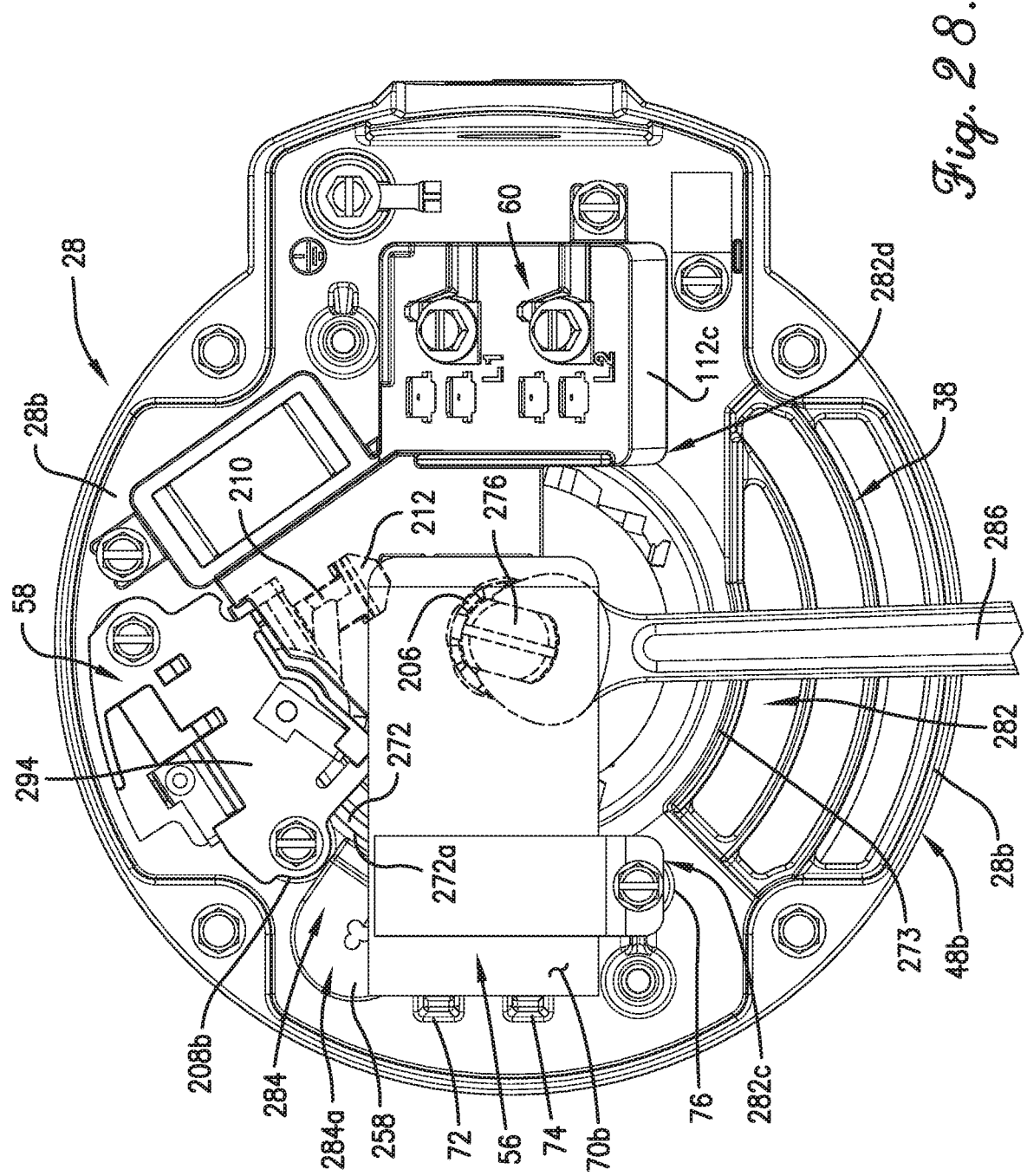

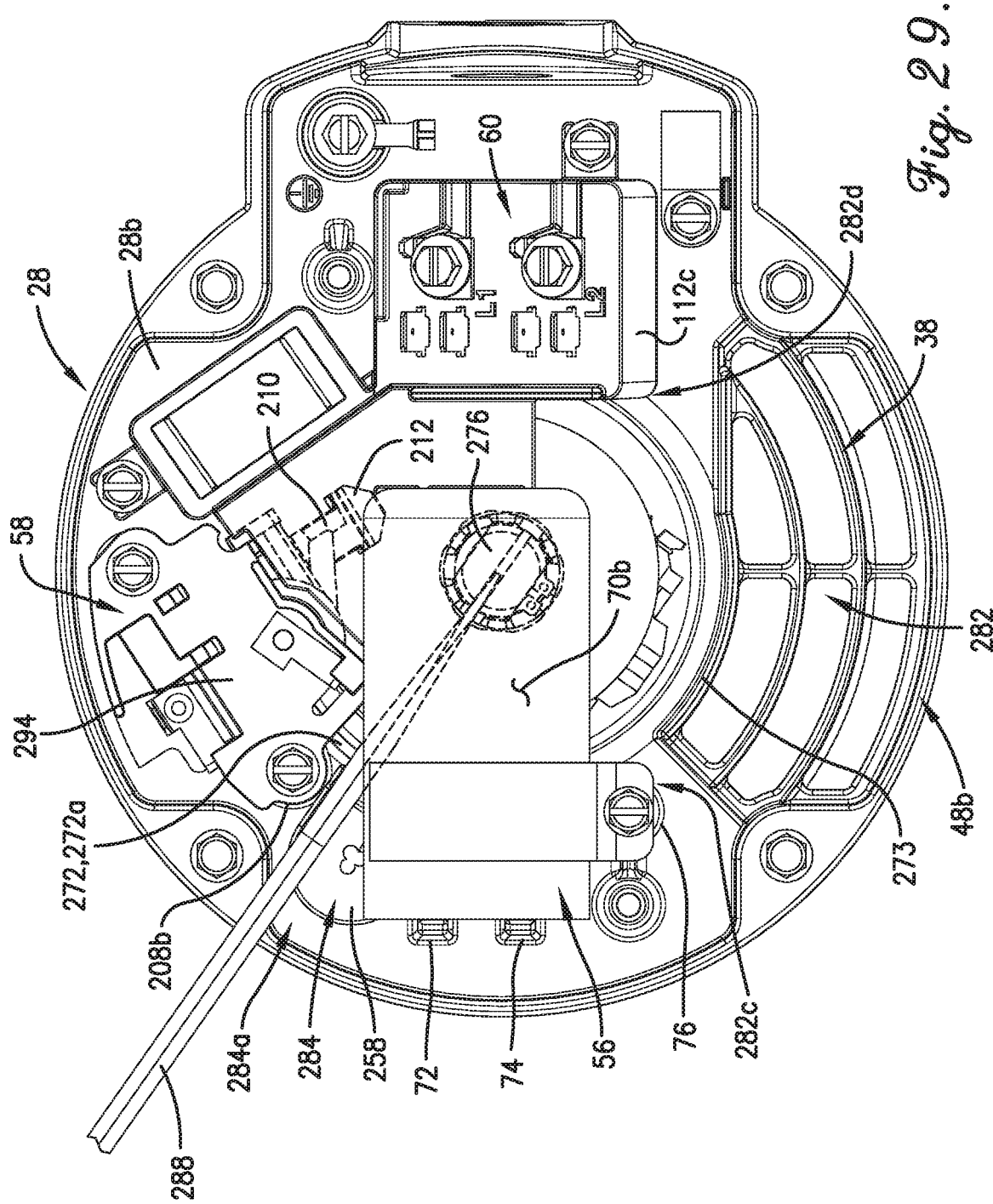

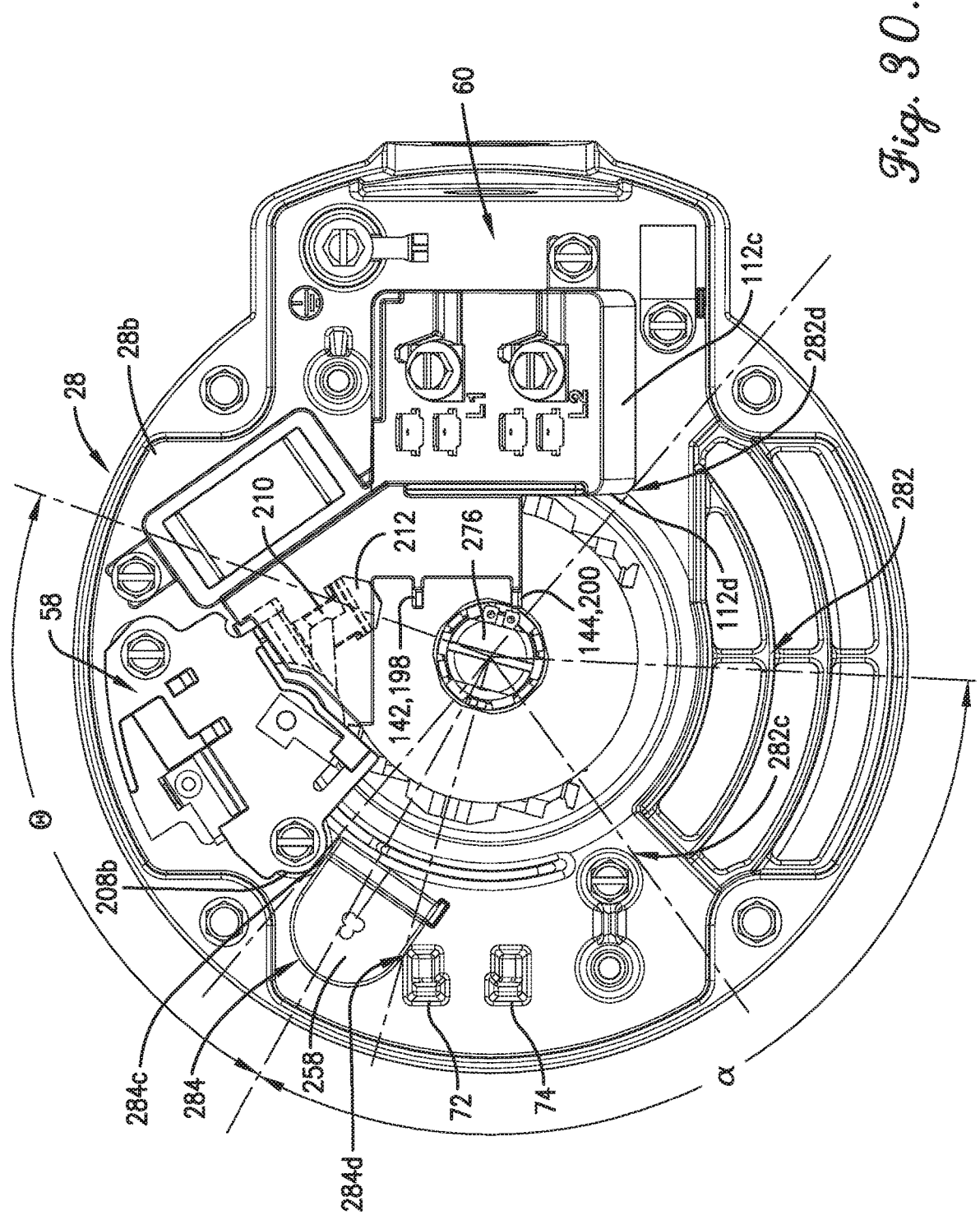

MOTOR HAVING LIMITED LEAD-END SHAFT ACCESS

CROSS-REFERENCE TO RELATED APPLICATIONS

1. Priority Applications

The present application is a continuation of U.S. patent application Ser. No. 15/791,034, filed Oct. 23, 2017, which claims the benefit of and priority from U.S. Provisional Patent Application No. 62/411,367, filed Oct. 21, 2016, the entire disclosure of each of which is hereby incorporated by reference herein.

BACKGROUND OF THE INVENTION

1. Field of the Invention

The present invention relates generally to an electric motor including a switch assembly.

2. Discussion of the Prior Art

Those of ordinary skill in the art will appreciate that conventional electric motors may include a switch assembly associated with control of one or more aspects of motor operation. Such motors may also include a shaft having axially opposed ends. One of the shaft ends may be associated with an output mechanism or assembly, such as a pump. To secure the output mechanism relative to the shaft, it is often necessary to access the shaft end opposite the mechanism (e.g., by a wrench, screwdriver, or other tool). More particularly, the opposite end of the shaft is often engaged in such a manner as to be held at least substantially stationary during installation or removal of the output mechanism or assembly. Alternatively, some degree of rotation (e.g., in a direction counter to that of the output mechanism or assembly during installation or removal) might be imparted on the opposite end of the shaft by the tool. Furthermore, the shaft end opposite the output mechanism is often associated with the motor controller and associated components, such as the switch assembly. Inadvertent contact with the switch assembly (e.g., by the tool) during such an access process is undesirable.

SUMMARY

According to one aspect of the present invention, a motor is provided. The motor comprises a stator, a rotor rotatable relative to the stator about an axis, an electrical component, and shield structure. The rotor includes a shaft presenting a shaft lead end. The shaft lead end and the electrical component are disposed axially outward of the stator. The shield structure is in part disposed axially outward of the electrical component to at least substantially restrict direct tool access to the electrical component from an axially outward position relative to the electrical component. The shield structure further at least in part defines a tool access channel extending to the shaft lead end, such that the shield structure enables direct tool access to the shaft lead end via the tool access channel. The shaft lead end is at least in part disposed between the tool access channel and the electrical component, such that the shaft lead end at least substantially restricts direct tool access to the electrical component via the tool access channel.

According to another aspect of the present invention, a motor is provided. The motor comprises a stator, a rotor rotatable relative to the stator about an axis, an electrical component, and shield structure. The rotor includes a shaft presenting a shaft lead end. The shaft lead end and the electrical component are disposed axially outward of the stator. The shield structure is in part disposed axially outward of the electrical component to at least substantially restrict direct tool access to the electrical component from an axially outward position relative to the electrical component. The shield structure further at least in part defines a tool access channel extending inwardly to the shaft lead end in a first direction, such that the shield structure enables direct tool access to the shaft lead end via the tool access channel. The electrical component is spaced from the shaft in a second direction non-opposite the first direction. The second direction is angularly spaced from the first direction by an offset angle such that the shield structure at least substantially restricts direct tool access to the electrical component via the tool access channel.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 1 is a pump-end (or front) perspective view of a motor according to a preferred embodiment of the present invention;

FIG. 2 is a lead-end (or rear) perspective view of the motor of FIG. 1;

FIG. 16 is a perspective view of the lead-end endshield of the motor of FIGS. 1-14, from a vantage point largely opposite that of FIG. 15;

FIG. 17 is a front perspective view of the capacitor of the motor of FIGS. 1-14;

FIG. 18 is a rear perspective view of the capacitor of FIG. 17;

FIG. 19 is a front view of the capacitor of FIGS. 17 and 18;

FIG. 20 is a side elevational view of the capacitor of FIGS. 17-19;

FIG. 21 is an enlarged, top perspective view of the terminal board assembly of the motor of FIGS. 1-14;

FIG. 22 is a bottom perspective view of the terminal board assembly of FIG. 21;

FIG. 23 is a side elevational view of the terminal board assembly of FIGS. 21 and 22;

Figure 24:
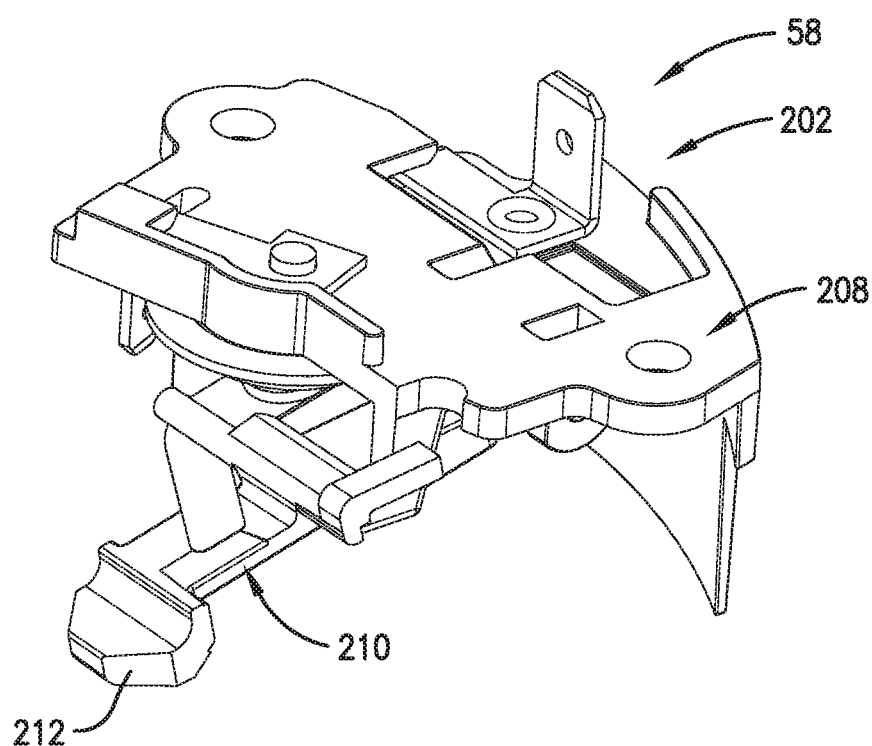
FIG. 24 is an inner, top perspective view of the switch portion of the switch assembly of the motor of FIGS. 1-14.
Figure 25:
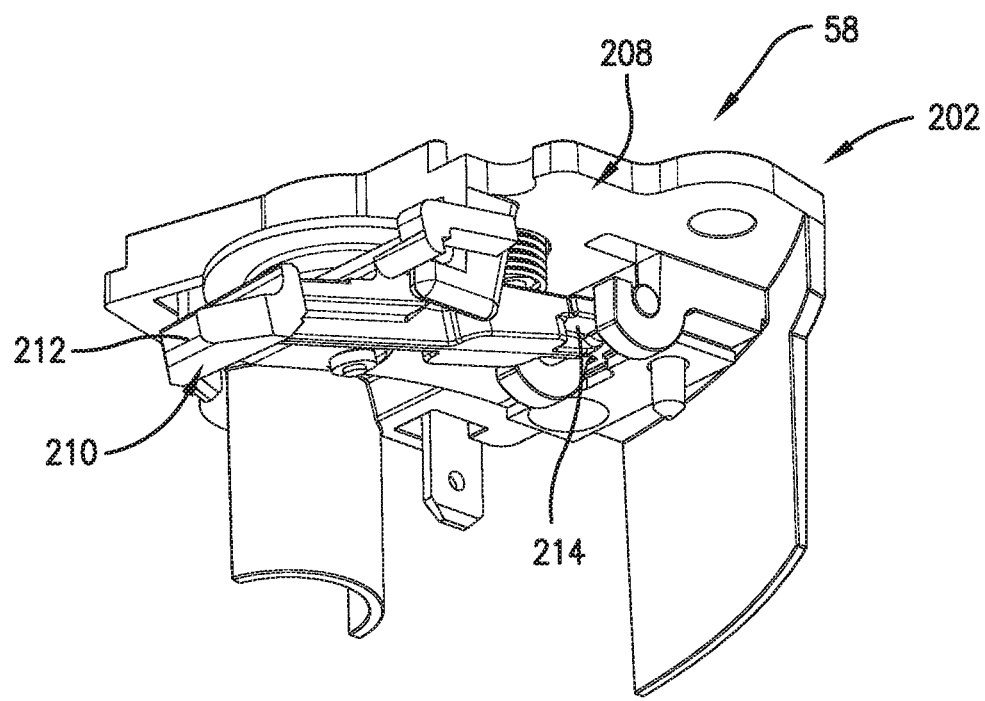
FIG. 25 is an inner, bottom perspective view of the switch portion of FIG. 24.
Figure 26:
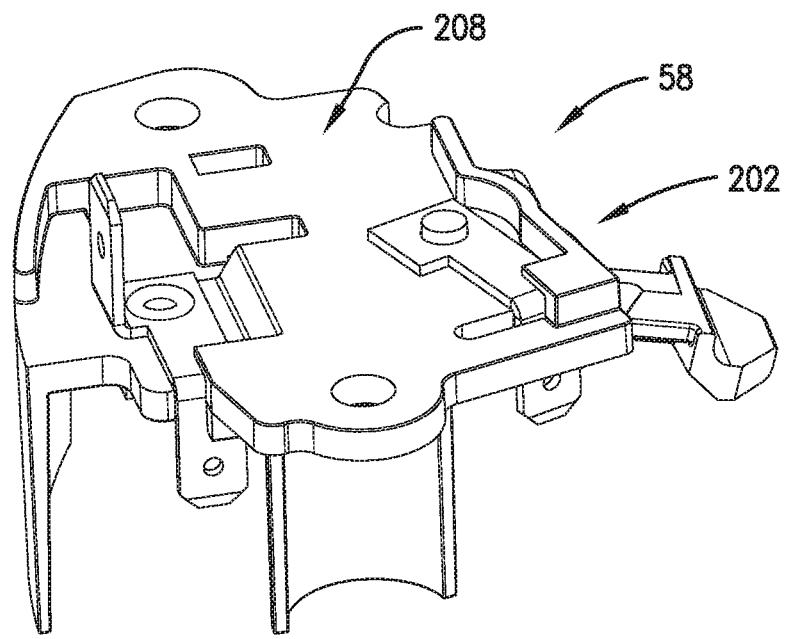
Figure 27:
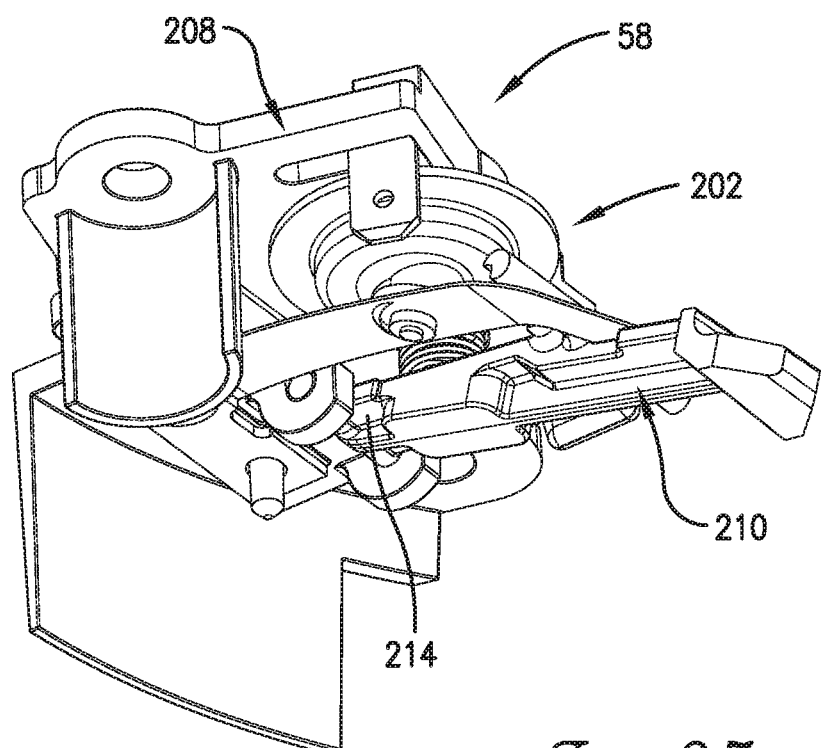

FIG. 26 an outer, top perspective view of the switch portion of FIGS. 24 and 25;

FIG. 27 is an outer, bottom perspective view of the switch portion of FIGS. 24-26;

FIG. 28 is a lead-end (or rear) view of the motor of FIGS. 1-14, with the cover removed, and particularly illustrating a wrench accessing the shaft via the first tool access channel;

FIG. 29 is a lead-end (or rear) view of the motor of FIGS. 1-14 and 28, with the cover removed, and particularly illustrating a screwdriver accessing the shaft via the second tool access channel; and FIG. 30 is a lead-end (or rear) view of the motor of FIGS. 1-14, 28, and 29, with the cover removed, and particularly illustrating the relative angular dispositions of the switch arm (at the actuating end thereof) and the first and second tool access channels.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45) angle relative to the axis but, because the element extends at least in part along the axis, it should still be considered axial. Similarly, the terms radial, radially, and variations thereof shall be interpreted to mean the element has at least some directional component in the radial direction relative to the axis.

It is further noted that the term annular shall be interpreted to mean that the referenced object extends around a central opening so as to be generally toroidal or ring-shaped. It is not necessary for the object to be circular, nor does the object have to be continuous. Similarly, the term toroidal shall not be interpreted to mean that the object must be circular or continuous.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Overview

In a preferred embodiment, an electric motor 10 is provided. The motor 10 is preferably a pump motor. More particularly, the motor 10 is preferably for use in applications requiring or potentially subject to exposure to dust, moisture, or other environmental contaminants. For instance, the motor 10 might suitably be a pool pump motor configured for assembly with a filter pump for circulating and filtering water of body of water such as an above-ground swimming pool. However, other applications, including those not associated with a pump, are permissible according to some aspects of the present invention.

The motor 10 preferably includes a stator 12 and rotor 14 rotatable about an axis. In a preferred embodiment, as shown, the stator 12 at least substantially circumscribes the rotor 14, such that the motor 10 is an inner rotor motor. It is permissible according to some aspects of the present invention, however, for the motor to be an outer rotor motor or a dual rotor motor.

The stator 12 preferably includes a stator core 16 and a plurality of coils 18 (shown schematically) wound about the core 16. The coils 18 preferably comprise electrically conductive wiring 20.

The rotor 14 preferably includes a rotor core (not shown), a plurality of magnets (not shown) and a shaft assembly 22 defining a rotational axis for the rotor 14.

The motor 10 further preferably includes a housing 24. The housing 24 preferably includes a shell 26, a lead-end endshield 28, and a pump-end endshield 30. The shell 26 and the lead-end and pump-end endshields 28 and 30, respectively, preferably present a motor chamber 32 that at least substantially receives the stator 12 and the rotor 14.

In a preferred embodiment, the shell 26 extends generally circumferentially about the stator 12. It is permissible according to some aspects of the present invention, however, for the shell to extend in such a manner as to provide one or more flat sides, in contrast to the preferred generally cylindrical form, or to be otherwise alternatively shaped.

The shell 26 preferably extends generally continuously and is devoid of apertures. However, it is permissible according to some aspects of the present invention for the shell to include openings or slots therethrough. For instance, openings or slots may be provided for ventilation and/or access purposes.

The lead-end and pump-end endshields 28 and 30 preferably support respective lead-end and pump-end bearing assemblies 34 and 36 that rotatably support the shaft assembly 22. Alternative or additional bearing assembly supports or shaft assembly supports may be provided without departing from the scope of the present invention, however.

The lead-end and pump-end endshields 28 and 30 are preferably fixed relative to the shell 26 by any means known in the art, including but not limited to discrete fasteners, contact/friction, integral formation, latches, adhesives, welding, etc.

In a preferred embodiment, as illustrated, the pump-end endshield 30 is at least substantially solid in construction, such that ingress of contaminants therethrough is at least generally prohibited. The lead-end endshield 28, however, preferably includes ventilation structure 38, which will be discussed in greater detail below, therein. However, alternative configurations fall within the scope of the present invention.

Furthermore, although the illustrated lead-end endshield 28 and pump-end endshield 30 are generally circular in cross-sectional shape, alternative shapes (e.g., square, oval, etc.) are permissible.

With continued regard to the lead-end endshield 28, the lead-end endshield 28 preferably broadly includes a base plate 40, capacitor-mounting structure 42, wire-routing structure 44, and the aforementioned ventilation structure 38.

The housing 24 further preferably includes a cover 46 that cooperates with the lead-end endshield 28 to define an electrical component chamber or electronics compartment 48 for at least substantially enclosing various structures 49 (both electrical and non-electrical) that will be described in greater detail below. A cover at least substantially similar to the cover 46 is disclosed in U.S. Pat. No. 6,831,382 to Lyle et al., issued Dec. 14, 2004, entitled COVER FOR ELECTRIC MOTOR, the entire disclosure of which is hereby incorporated by reference herein. Most preferably, the cover 46 is removably fixed relative to the lead-end endshield 28.

It is particularly noted that various modifications to the illustrated cover design are permissible without departing from the scope of the present invention. Among other things, for instance, the cover might include a plurality of reinforcement ribs along either or both of an end face and sidewall thereof.

The lead-end endshield 28 preferably presents opposite inner and outer endshield sides 28a and 28b. The inner side 28a at least in part defines the motor chamber 32; the outer side 28b at least in part defines the electronics compartment 48.

The motor 10 further preferably includes mounting structure 50 for coupling the motor 10 and a pump (not shown). More particularly, the mounting structure 50 preferably includes a plurality of bosses 52 defining fastener-receiving holes 54 through which fasteners (not shown) might pass to secure the pump and the motor 10 to each other.

Capacitor Mounting Structure

As noted previously, the electronics compartment 48 preferably houses a variety of structures 49. Such structures 49 preferably include a capacitor 56, a switch assembly 58, a terminal board assembly 60, and wire-routing structures 44. However, alternative or additional components, as well as fewer components, might be provided as part of said "structures" without departing from some aspects of the present invention. For instance, the switch assembly might be of an alternative type, additional wire-routing structure might be provided, or control circuitry might be present. Such alternatives will be discussed in greater detail below.

The motor 10 is preferably a capacitor-start motor. The capacitor 56 may be of any type known in the art without departing from some aspects of the present invention. The illustrated capacitor, however, is a start capacitor that presents a generally cylindrical body 64 having axially spaced apart terminal and other ends 66 and 68. The body 64 also presents a curved outer surface 70 that includes axially opposed inner and outer surfaces 70a and 70b, respectively.

The capacitor 56 is preferably mounted to the lead-end endshield 28. For instance, in a preferred embodiment, the lead-end endshield 28 presents a pair of arcuately spaced apart capacitor support columns 72 and 74, as well as a capacitor boss 76. The capacitor support columns 72 and 74 each preferably include a respective generally axially projecting base 78 or 80 and a generally axially projecting retention wall 82 or 84 projecting from the base 78 or 80. Each capacitor support column 72 and 74 also preferably defines a respective shelf 86 or 88 adjacent the corresponding retention wall 82 or 84. More particularly, each base 78 or 80 preferably presents a face 90 or 92 that defines the corresponding shelf 86 or 88 and from which the retention wall 82 or 84 projects.

Each face 90 and 92 and, in turn, each shelf 86 and 88, is preferably at least substantially smooth, although irregularities are permissible according to some aspects of the present invention. Furthermore, each face 90 and 92 and associated shelf 86 and 88 preferably angles or slopes downwardly and inwardly toward the other of the shelves 86 and 88 or faces 90 and 92. That is, the shelf 86 presents an upper margin 86a and a lower margin 86b, with the lower margin 86b being arcuately nearer the other capacitor support column 74 and shelf 88 than is the upper margin 86a. Likewise, the shelf 88 presents an upper margin 88a and a lower margin 88b, with the lower margin 88b being arcuately nearer the other capacitor support column 72 and shelf 86 than is the upper margin 88a. Alternatively stated, the lower margins 86b and 88b are adjacent one another (but preferably not abutting one another), while the upper margins 86a and 88a are non-adjacent, with the shelves 86 and 88 being disposed arcuately between the upper margins 86a and 88a.

It is particularly noted that such beveled or angular disposition of the shelves 86 and 88 axially downwardly and toward one another is particularly suitable for support of a cylindrically bodied capacitor 56, as is preferred. However, in alternative embodiments, the shelves might be alternatively oriented to better support an alternatively shaped capacitor. Yet further, although not preferred, alternative orientations might be present even with a capacitor shaped as shown. For instance, shelves that extend generally orthogonally relative to the rotor axis might nonetheless support a generally cylindrical capacitor.

Preferably, the capacitor 56 is oriented to extend generally radially relative to the motor axis. That is, in a preferred embodiment, the terminal end 66 is positioned radially outwardly relative to the other end 68. It is permissible, however for the capacitor to be alternatively oriented (preferably in conjunction with alternative positioning of the capacitor support columns).

In a preferred embodiment, the terminal end 66 rests on the shelves 86 and 88 and presents a terminal end face 94 that abuts the retaining walls 82 and 84. Additionally, it is preferred that the outer surface 70 of the body 64 at the terminal end 66 rests on the shelves 86 and 88. It is permissible according to some aspects of the invention, however, for the other end to rest on the shelves and/or abut the retaining walls. Furthermore, it is permissible according to some aspects of the present invention for the adjacent one of the capacitor ends to be spaced from the retaining walls. That is, in a preferred orientation, the terminal end of the capacitor might be adjacent but not abut the retaining walls, without departing from the scope of the present invention.

Furthermore, it is permissible according to some aspects of the present invention for the other end to be adjacent the retaining walls, rather than the terminal end.

The capacitor boss 76 is preferably disposed radially inwardly of and arcuately outwardly from (i.e., not in between) the capacitor support columns 72 and 74, although alternative positioning is permissible according to some aspects of the present invention.

The capacitor boss 76 preferably defines a fastener-receiving hole 96. A clamp 98 and a fastener 100 are also provided. The clamp 98 preferably defines a fastener aperture 102. The clamp 98 preferably in part circumscribes the capacitor 56 and is secured to the capacitor boss 76 by means of the fastener 100, which extends through the fastener aperture 102 and into the fastener-receiving hole 96. More particularly, the clamp 98 preferably extends generally semicircularly about approximately half the circumference of the capacitor 56. The clamp 98 is preferably disposed adjacent the terminal end 66, although alternative positioning along the cylindrical body 64 is permissible. The clamp 98 preferably functions to additionally secure the capacitor 56 on the shelves 86 and 88.

In a preferred embodiment, the capacitor support columns 72 and 74, as well as the capacitor boss 76, are integrally formed with the lead-end endshield 28. Discrete formation of one or more of these components is permissible according to some aspects of the present invention, however, with relative securement between such discrete component or components and the lead-end endshield being by any means known in the art (e.g., welding, adhesives, fasteners, latches, etc.).

Terminal Board Assembly

As noted previously, the electronics compartment 48 additionally houses a terminal board assembly 60. Broadly speaking, the terminal board assembly 60 is configured to engage wiring (not shown) associated with the motor 10. Potential functions of the terminal board assembly 60 will be readily apparent to those of ordinary skill in the art and will not be discussed in detail herein.

Preferably, the terminal board assembly 60 includes a wiring portion 104, a voltage portion 106, and a capacitor portion 108.

In a broad sense, the wiring portion 104 preferably includes wire connection structure 110 consistent with the performance and operational needs of the motor 10. More particularly, the wiring portion 104 preferably includes four sides 112*a*, 112*b*, 112*c*, 112*d* disposed generally orthogonally relative to one another to form a substantially rectangular shape. The wiring portion 104 also preferably includes a top 114 extending between and connecting the sides 112*a*, 112*b*, 112*c*, 112*d*. The wire-connection structure 110 is preferably disposed on the top 114, which includes corresponding recesses 116 for receiving such structure 110.

Preferably, the side 112*c* is axially taller than the side 112*a*, such that the top 114 slopes downwardly from side 112*c* to 112*a* to connect structure 110 with greater top-down visibility.

The wiring portion 104 also preferably includes a shield 118 extending continuously (and, preferably, integrally) from the side 112*d*, upwardly in a generally axial direction relative to the top 114. The shield 118 preferably provides a physical barrier between the wire connection structure 110 (and wiring associated therewith) and the capacitor 56 (more particularly, the other end 68 thereof).

The voltage portion 106 preferably includes sides 120*a*, 120*b*, 120*c*, 120*d* so as to be generally rectangular in form and define an opening 122 for a voltage change switch (not shown). Such portion and switch may be omitted without departing from the scope of the present invention, however, or the portion may be alternatively shaped.

Preferably, the voltage portion 106 is disposed adjacent side 112*a* of the wiring portion 104, although alternative positioning is permissible according to some aspects of the present invention.

A first mounting tab 126 preferably extends from the side 112*b* of the wiring portion 104, while a second mounting tab 128 preferably extends from the side 120*a* of the voltage portion 106. Fasteners 130 and 132 preferably extend through respective ones of the tabs 126 and 128 into respective apertures 134 and 136 in the lead-end endshield 28 to fix the terminal board assembly 60 to the lead-end endshield 28. Alternative or additional fastening means, including but not limited to welding, adhesives, or latches, may additionally or alternatively be used, however. Furthermore, more or fewer fasteners and/or tabs might be provided, and/or the tabs might be alternatively positioned. Yet further, integral formation of the terminal board assembly with the lead-end endshield 28 is also permissible according to some aspects of the present invention.

In a preferred embodiment, as illustrated, the capacitor portion 108 includes a top plate 138 extending in a plane generally orthogonal to the motor axis; a sidewall 140 extending axially downwardly from and orthogonally relative to the top plate 138 to interconnect the top plate 138 with the side 120*d* of the voltage portion 106; and a pair of brackets 142 and 144 extending generally downwardly from and orthogonally relative to the top plate 138.

Furthermore, the top plate 138 and the brackets 142 and 144 also extend generally radially inwardly relative to the voltage portion 106 and the wiring portion 104. More particularly, the top plate 138 preferably extends directly from the shield 118 of the wiring portion 104, while the brackets 142 and 144 extend directly from the side 112*d* of the wiring portion 104.

Preferably, the top plate 138 includes a cutout 146 sized and shaped to receive the other end 68 of the capacitor 56. More particularly, the cutout 146 preferably presents a side edge 148 that extends alongside the outer surface 70 of the capacitor body 64 adjacent and radially outwardly from the other end 68. The side edge 148 is preferably slightly spaced from the outer surface 70 but may engage it without departing from some aspects of the present invention.

The cutout 146 also preferably presents a back edge 150 that extends alongside an end face 152 of the other end 68 of the capacitor body 64. The back edge 150 is preferably slightly spaced from the end face 152 but may engage it without departing from some aspects of the present invention.

In addition to the end face 152, the other end 68 of the capacitor body 64 preferably includes a recess or well 154 adjacent the end face 152. The well 154 is preferably in the form of an arched door and is defined by a back wall 156, a pair of spaced apart sides 158 and 160 oriented generally orthogonally to the back wall 156, and an arched roof 162 interconnecting the sides 158 and 160 and also extending generally orthogonally from the back wall 156.

Preferably, the back wall 156, the end face 152, and the back edge 150 each extend generally parallel to one another, although such an arrangement is not essential to some aspects of the present invention.

Preferably, the other end 68 of the capacitor 56 also presents a generally curved transition face 166 extending between and interconnecting the end face 152 with the outer surface 80 of the body 64. Preferably, the transition face 166 extends in the form of an arch, in keeping with the preferred extension of the end face 152. Alternative shapes or extents are permissible according to some aspects of the present invention, however.

In a preferred embodiment, each of the brackets 142 and 144 includes a positioner 168 or 170 extending generally orthogonally relative to the back edge 150. Each bracket 142 or 144 also includes a respective support component 172 or 174 extending from the corresponding one of the positioners 168 or 170, also generally orthogonally relative to the back edge 150. The positioner 168 preferably presents a front face 176 and spaced apart inner and outer faces 178 and 180, respectively. Similarly, the positioner 170 preferably presents a front face 182 and spaced apart inner and outer faces 184 and 186, respectively.

The brackets 142 and 144 (or, more particularly, the positioners 168 and 170) are preferably disposed such that back edge 150 of the capacitor 56 abuts each of the front faces 176 and 182. Thus, a gap 188 is formed between the inner faces 178 and 184, the back wall 156, and the back edge 150. Furthermore, the brackets 142 and 144 (or, more particularly, the positioners 168 and 170) are preferably disposed such that the outer faces 180 and 186 each engage or nearly engage respective ones of the sides 158 and 160 that in part define the capacitor well 154. Thus, the positioners 168 and 170 aid in locating the capacitor 56 laterally relative to the terminal plate assembly 60.

The support components 172 and 174 of the brackets 142 and 144 are preferably configured to support the other end 68 of the capacitor 56. That is, the support components 172 and 174 of the brackets 142 and 144 preferably cooperate primarily with the capacitor support columns 72 and 74 to support the capacitor 56. More particularly, in a preferred embodiment, each support component 172 or 174 presents a face 190 or 192 that defines a corresponding shelf 194 or 196. The other end 68 of the capacitor 56 rests on the shelves 194 and 196.

Each face 190 and 192 and, in turn, each shelf 194 and 196, is preferably at least substantially smooth, although irregularities are permissible according to some aspects of the present invention. Furthermore, each face 190 and 192 and associated shelf 194 and 196 preferably angles or slopes downwardly and inwardly toward the other of the shelves 194 and 196 or faces 190 and 192. That is, the shelf 194 preferably presents an upper margin 194a and a lower margin 194b, with the lower margin 194b being arcuately nearer the other support component 174 and shelf 196 than is the upper margin 194a. Likewise, the shelf 196 preferably presents an upper margin 196a and a lower margin 196b, with the lower margin 196b being arcuately nearer the other support component 172 and shelf 194 than is the upper margin 196a. Alternatively stated, the lower margins 194b and 196b are preferably adjacent one another (but preferably not abutting one another), while the upper margins 194a and 196a are preferably non-adjacent, with the shelves 194 and 196 being disposed arcuately between the upper margins 194a and 196a.

It is particularly noted that such beveled or angular disposition of the shelves 194 and 196 axially downwardly and toward one another is particularly suitable for support of a cylindrically bodied capacitor 56, as is preferred. However, in alternative embodiments, the shelves might be alternatively oriented to better support an alternatively shaped capacitor. Yet further, although not preferred, alternative orientations might be present even with a capacitor shaped as shown. For instance, shelves that are generally orthogonally extending relative to the axis might nonetheless support a generally cylindrical capacitor.

As will be discussed in greater detail below, each support component 172 and 174 also preferably extends downwardly (i.e., axially inwardly) toward the base plate 40 of the lead-end endshield 28. For instance, the support component 172 preferably extends in such a manner as to form a generally rectangular barrier wall 198. The support component 174, in contrast, preferably extends in such a manner as to form a generally triangular barrier wall 200.

Start Switch Assembly

As noted previously, the motor 10 preferably includes the switch assembly 58. Preferably, in keeping with the preferred start capacitor embodiment, the switch assembly 58 is a start switch assembly 58. At least some principles of the present invention apply to other types or alternatively functioning switches, however.

Preferably, the switch assembly 58 is responsive to a rotational characteristic of a shaft 206 of the motor shaft assembly 22. In the preferred switch assembly 58, for instance, switching occurs when the rotor 14 (or, more specifically, the shaft 206) is rotating at a sufficient speed. More particularly, in a preferred embodiment, the switch assembly 58 is preferably engaged and the capacitor 56 and an associated auxiliary winding (not shown) are active while the motor 10 is accelerating from stationary to a predefined speed (preferably a percentage of full operational speed). The switch assembly 58 preferably disengages and thereby switches off the capacitor 56 and the auxiliary winding when the predefined speed has been achieved. It is permissible according to some aspects of the present invention, however, for an alternatively functioning switch (which may not even be associated with the capacitor) to be provided without departing from the scope of the present invention. For instance, the switch might be oppositely configured, such that the capacitor is operable when the switch is disengaged but shuts off when the switch engages.

In a preferred embodiment, the switch assembly 58 is a centrifugal switch. However, alternative switch types (e.g., speed, pressure, push-button, toggle, joystick, lever-actuator, selector, fluid-based, etc.) might be used without departing from the scope of the present invention Preferably, the switch assembly 58 includes a switch portion 202 and an actuating portion 204. The switch portion 202 preferably includes a support body 208 and a switch arm 210 shiftable between axially outer (or upper) and axially inner (or lower) positions.

The support body 208 is preferably fixed to the lead-end endshield 28. Most preferably, the support body 208 is fixed to bosses 208a and 208b, which are integrally formed with the lead-end endshield 28, by fasteners 209a and 209b, respectively. Alternative fixation means are permissible, however, and include but are not limited to adhesives, welding, integral formation, latches, alternative or additional fasteners, etc.

The switch arm 210 preferably includes a radially inwardly disposed or distal actuating end 212 and a radially outwardly disposed or proximal opposite end 214. The switch arm 210 is pivotable about the opposite end 214. A shiftable contact is preferably mounted on the arm 210 between the actuating end 212 and the opposite end 214. The actuating end is preferably configured for engagement with the actuating portion 204, as will be discussed in greater detail below. The shiftable contact is preferably configured for engagement with a stationary contact operably connected to the capacitor 56 (e.g., by means of wiring, not shown), such that disruption of the circuit disengages the capacitor and auxiliary winding.

In a preferred embodiment, as illustrated, the actuating portion 204 includes a disc 220, a pair of weights 222, and a pair of springs 223 each extending between and interconnecting the weights 222.

Radially outward pivoting or shifting of the weights 222 in response to rotation of the shaft 206 (i.e., pivoting or shifting of the weights 222 due to centrifugal force) preferably results in axial shifting of the disc 220. In the illustrated embodiment, such axial shifting is axially inward (i.e., downward). However, the actuating portion may be configured in any manner known in the art without departing from the scope of some aspects of the present invention. For instance, axially outward shifting might occur in response to sufficiently rapid shaft rotation and/or a broadly disparate design (e.g., one utilizing alternatively configured or moveable weights, being driven primarily by non-centrifugal forces, etc.) might be used.

With further regard to the preferred embodiment, the actuating end 212 of the switch arm 210 preferably rests on the disc 220. When the motor 10 is at rest, the weights 222 are preferably disposed in a radially inward position. The disc 220 and the switch arm 210 are in an axially outward (or upper) position. When the motor 10 is initially turned on, the switch arm 210 completes a circuit (not shown) such that the capacitor 56 and the auxiliary winding are engaged. Engagement of the capacitor preferably facilitates a quick start-up of the motor 10. As the motor shaft 206 accelerates, the weights 222 pivot radially outwardly due to centrifugal force. When the motor 10 has achieved the aforementioned predetermined speed, radially outward shifting of the weights 222 will have preferably resulted in or triggered a discrete axially inward (downward) shift of the disc 220 and, in turn, of the actuating end 212 of the switch arm 210. The switch assembly 58 is preferably configured such that this shift will break or disrupt the capacitor and auxiliary winding circuit (not shown) and thus disengage the capacitor 56 and the auxiliary winding. That is, the shiftable contact and the stationary contact preferably disengage upon the inward shift, such that the capacitor 56 no longer contributes to operation of the motor 10.

It is particularly noted that, while suitable configurations of wiring, contacts, etc. associated with the necessary circuitry for operation of the switch assembly are not shown and/or described in detail herein, such configurations and details thereof will be readily apparent to one of ordinary skill and the art and may additionally be modified to suit the particular application.

Furthermore, it will be readily understood by those of ordinary skill in the art that any of a variety of "triggering mechanisms" to implement the above-described axially inward shift of the actuating disc may be employed without departing from the scope of the present invention. For instance, the disc might slip or shift from a resting position on a first stop to a resting position on a second stop, or a single stop on which the disc rests might itself shift from one position to another.

It is also reiterated that many other structural and/or operational features associated with the switch might vary without departing from the scope of some aspects of the present invention. For instance, among other things, the shiftable contact of the switch arm might instead be initially spaced from a corresponding stationary contact, only to connect a circuit upon axially inward shifting of the actuating disc (i.e., the capacitor might be switched off upon completion of an associated circuit, rather than disconnection thereof, by means of the switch); the switch might both complete and disrupt disparate circuits simultaneously; or the actuating disc might shift axially outwardly rather than inwardly in response to radially outward shifting of the weights.

It is also again particularly noted that any of a variety of switch types might be used without departing from the scope of some aspects of the present invention, with such designs including both alternate centrifugal switch designs and entirely different designs (e.g., designs based on electronic speed sensing).

Additional Features of Lead-End Endshield and Cover

The lead-end endshield 28 preferably presents several other features in addition to those discussed above. In a preferred embodiment, for instance, the lead-end endshield 28 includes a pair of fastener-receiving posts 224 and 226. Fasteners 228 and 230 preferably extend through the cover 46 and into respective ones of the posts 224 and 226 to secure the cover 46 to the lead-end endshield 28.

A plurality of fastener recesses 232 and associated openings 234 are also preferably defined by the lead-end endshield 28 adjacent an outer circumferential margin 236 thereof. Fasteners 238 preferably extend through the openings 234, through corresponding openings 240 in the stator 12, and out of corresponding openings 242 in the pump-end endshield 30 to fix the endshields 28 and 30 and the stator 12 to one another.

The aforementioned ventilation structure 38 preferably includes a plurality of ribs 244 defining ventilation slots 246 therebetween. The slots 246 are preferably provided to allow transfer of air and any particulate therein (e.g., water vapor) through the lead-end endshield 28. Preferably, such transfer is operable to cool the motor 10.

A variety of wire-routing structure 44 is also preferably provided. For instance, a tab 248 defining a wiring pass-through 250 preferably extends generally axially from the base plate 40 adjacent the outer circumferential margin 236 of the lead-end endshield 238. Wiring (not shown) may extend through the pass-through 250 as desired to connect external structures with components inside the electronics compartment 48.

A pair of grommet-receiving recesses 252 and 254 preferably receive corresponding pass-through grommets 256 and 258 between positioning stops 260 and 262 and enable at least substantially sealed routing of wiring (not shown) between the electronics compartment 48 and the motor chamber 32.

Furthermore, a wiring sleeve 264 is preferably mounted to an opening 266 in the lead-end endshield 28 and positioned in part by a stop 268.

Additional wire-routing structure 44 preferably includes generally axially projecting and arcuately or circumferentially extending walls 270, 272, and 273 that are preferably disposed at least substantially along an inner circumferential margin 274 of the lead-end endshield 28. Preferably, the walls 270, 272, and 273 are arcuately spaced apart. More particularly, the wall 270 is preferably disposed below the terminal board assembly 60, the wall 272 is preferably disposed below the capacitor 56 and the support body 208 of the switch portion 202, and the wall 273 is preferably disposed adjacent the ventilation structure 38.

Furthermore, it is noted that the cover 46 might in an alternative embodiment be provided with control mechanisms including but not limited to rocker, toggle, and/or air switches.

Limited Access Channels and Consequent Switch Arm Protection

As will be readily understood by those of ordinary skill in the art, it is generally preferable to protect sensitive motor components from inadvertent contact by users (including fabricators, assemblers, technicians, end users, etc.) and/or their tools (e.g., wrenches, screwdrivers, wire cutters, pliers, etc.). As will be discussed in greater detail below, the motor 10 of the present invention is particularly designed to restrict inadvertent contact of key portions of the switch assembly 58 by a user when securing a pump (not shown) or other driven output device or mechanism to the motor 10.

More particularly, the shaft 206 preferably includes a lead end 276 and a pump end or drive end 278 axially opposite the lead end 276. The shaft 206 preferably extends through the lead-end endshield 28 such that the lead end 276 is disposed axially outward of the outer side 28b. The switch assembly 58 and especially the switch arm 210 thereof are also preferably disposed axially outward of the outer side 28b. In greater detail still, the actuating end 212 of the switch arm 210 is preferably adjacent (but not in contact with) the shaft lead end 276. The motor 10 is designed to particularly restrict inadvertent contact of the switch arm 210 when a wrench, screwdriver, or other tool is used to hold the lead end 276 of the shaft 206 stationary as the pump or other driven structure is tightened onto the drive end 278. (The cover 46 will preferably have been removed prior to such process.) As will be discussed in greater detail below, such protective features are largely associated with the switch arm 210. Protection of the actuating end 212 due to its near proximity to the shaft lead end 276 is of particular importance. However, the actuator disc 220, the weights 222, and the springs 223 are protected to at least some extent, as well.

In a broad sense, the motor 10 includes shield structure 280 that prevents, restricts, or at least substantially prevents or restricts such inadvertent contact while also creating one or more predefined access channels intended to enable "safe" engagement of a tool with the shaft lead end 276. For instance, from a continued broad perspective, the shield structure 280 is in part preferably disposed axially outward of the switch actuating end 212 to at least substantially restrict direct tool access to the actuating end 212 from an axially outward position relative to the switch actuating end 212. The shield structure 280 also preferably at least in part defines a first tool access channel 282 extending radially inwardly to the shaft lead end 276, such that the shield structure 280 enables direct tool access to the shaft lead end 276 via the first tool access channel 282. Even further still, the shield structure 280 also preferably at least in part defines a second tool access channel 284 extending radially inwardly to the shaft lead end 276, such that the shield structure 280 enables direct tool access to the shaft lead end 276 via the second tool access channel 284.

Direct tool access as referred to herein should be understood to mean that the necessary tool (e.g., wrench, screwdriver, etc.) can be inserted between and/or through the components 49 (and preferably into the electronics compartment 48 defined in part by the cover 46) to readily engage the shaft lead end 276 and be sufficiently manipulated to cause at least some degree of movement of the shaft lead end 276, as might be required during the necessary operation (e.g., installing or removing a pump associated with the motor 10).

As will be discussed in still greater detail below, the shield structure 280 preferably comprises portions or the entireties of the aforementioned terminal board assembly 60 (including the wiring portion 104; the voltage portion 106; and the capacitor portion 108, particularly the pair of capacitor support brackets 142 and 144 and the axially extending sidewall 112d from which the capacitor support brackets 142 and 144 project), the switch portion support body 208 and associated boss 208b, the capacitor 56 and capacitor-mounting structure 42 (including the capacitor support columns 72 and 74, the capacitor boss 76, and the clamp 98), wire-routing structure 44 including the wire-routing wall 272 and the pass-through grommet 258, and the fastener-receiving posts 224 and 226 associated with mounting of the cover 46 to the lead-end endshield 28. Still further, in a broad sense, the shield structure 280 also includes portions of the base plate 40 of the lead-end endshield 28, the pass-through grommet 258, and ventilation structure 38.

However, it is permissible according to some aspects of the present invention for additional, alternative, and/or fewer components to constitute the shield structure. For instance, the motor might include additional switches (e.g., rocker, toggle, or air switches), a run capacitor (in addition to or instead of the preferred start capacitor), electronic motor control components, a timer, one or more electrical relays, moisture absorption devices or materials (e.g., foams or desiccants), or other features readily apparent to one of ordinary skill in the art.

Most preferably, however, the structures constituting the shield structure 280 are inherently necessary to motor and/or output (e.g., pump) operation. That is, it is preferred that components that function solely as shields and not in any other way associated with motor and/or output operation are either not present or limited. Alternatively stated, the shield structure 280 preferably comprises and most preferably consists essentially or entirely of so-called multi-purpose components that have some function beyond shielding. Such additional function might be structural (e.g., support of another component), electrical (e.g., control of the motor), thermal (e.g., ventilation), etc. Such preferred dual- or multi-purpose functionality of at least one and preferably many of the components of the shield structure 280 enables efficient and cost-effective shielding by eliminating the need for extra, dedicated shielding components (which would be associated with additional material and manufacturing costs, weight, etc.). It is permissible according to some aspects of the present invention, however, for the shield structure to include one or more components that function solely as shields (and therefore play no other dedicated, intentional role in motor function or output operation).

In keeping with the above, it is particularly noted that, in a preferred embodiment, at least one of the components of the shield structure 280 is an electronic component configured to at least in part control motor operation (e.g., the capacitor 56, the terminal board assembly 60, and the switch assembly 58). However, it is permissible according to some aspects of the present invention for the shield structure to be devoid of electronic components.

Axial and Radial Access Restrictions

In greater detail with regard to the aforementioned restriction of direct tool access to the switch actuating end 212 (and, more broadly, the switch arm 210) from an axially outward position relative thereto, it is preferred that the shield structure 280 includes the capacitor 56, which is preferably disposed axially outward of and in part overlapping the switch actuating end 212 (see, for instance, FIGS. 28 and 29). Similarly, the switch body 208 and the top plate 138 of the capacitor portion 108 of the terminal board assembly 60 are disposed axially outward of and in part overlapping the switch actuating end 212 and/or the switch arm 210 in a broad sense. Thus, axially inward direct tool access from an axially outermost margin 48a of the electronics chamber 48 is at least substantially restricted or prevented.

With the exception of the access channels 282 and 284 described in greater detail below, circumferential or radial access (e.g., access radially inwardly from a radially outermost margin 48b of the electronics chamber 48) is also at least substantially restricted or prevented. More particularly, such access is obstructed by at least the capacitor support columns 72 and 74, the capacitor boss 76, the support body bosses 208a and 208b, and the fastener-receiving posts 224 and 226; the ribs 244 of the ventilation structure 38; the wire-routing tab 248; the switch body 208 in a broad sense and in particular an outer wall 294 thereof; the circumferential or arcuate walls 270, 272, and 273; and the terminal board assembly 60 in a broad sense and in particular the sides 112b and 120b of the wiring portion 104 and voltage portion 106 thereof.

It is also noted that the actuating portion 204 of the switch assembly 58 (i.e., the disc 220, the weights 222, and the springs 223) are also protected against inadvertent contact to some extent by the structures described above with regard to the switch arm 210 or, more particularly, the actuating end 212 thereof.

First Tool Access Channel

Preferably, as noted previously, the shield structure 280 defines a first tool access channel 282 and a second tool access channel 284. Preferably, the second tool access channel 284 is angularly offset from the first tool access channel 282 by an access deviation angle α between about sixty (60) degrees and about one hundred seventy-five (175) degrees. The access deviation angle α is most preferably about one hundred fifteen (115) degrees However, the access deviation angle can vary without departing from some aspects of the present invention, in accordance with other motor design factors (e.g., a particular controller or wire-routing layout).

The first tool access channel 282 preferably extends generally radially inwardly (e.g., from the radially outermost margin 48b of the electronics chamber 48) to the shaft lead end 276 such that the shield structure 280 enables direct tool access to the shaft lead end 276 via the first tool access channel 282. The first tool access channel 282 is preferably disposed and oriented relative to the switch arm 210 and the actuating end 212 such that the shaft lead end 276 is at least in part disposed between the first tool access channel 282 and the switch actuating end 212. The shaft lead end 276 thus at least substantially restricts direct tool access to the switch actuating end 212 via the first tool access channel 282.

Figure 3:
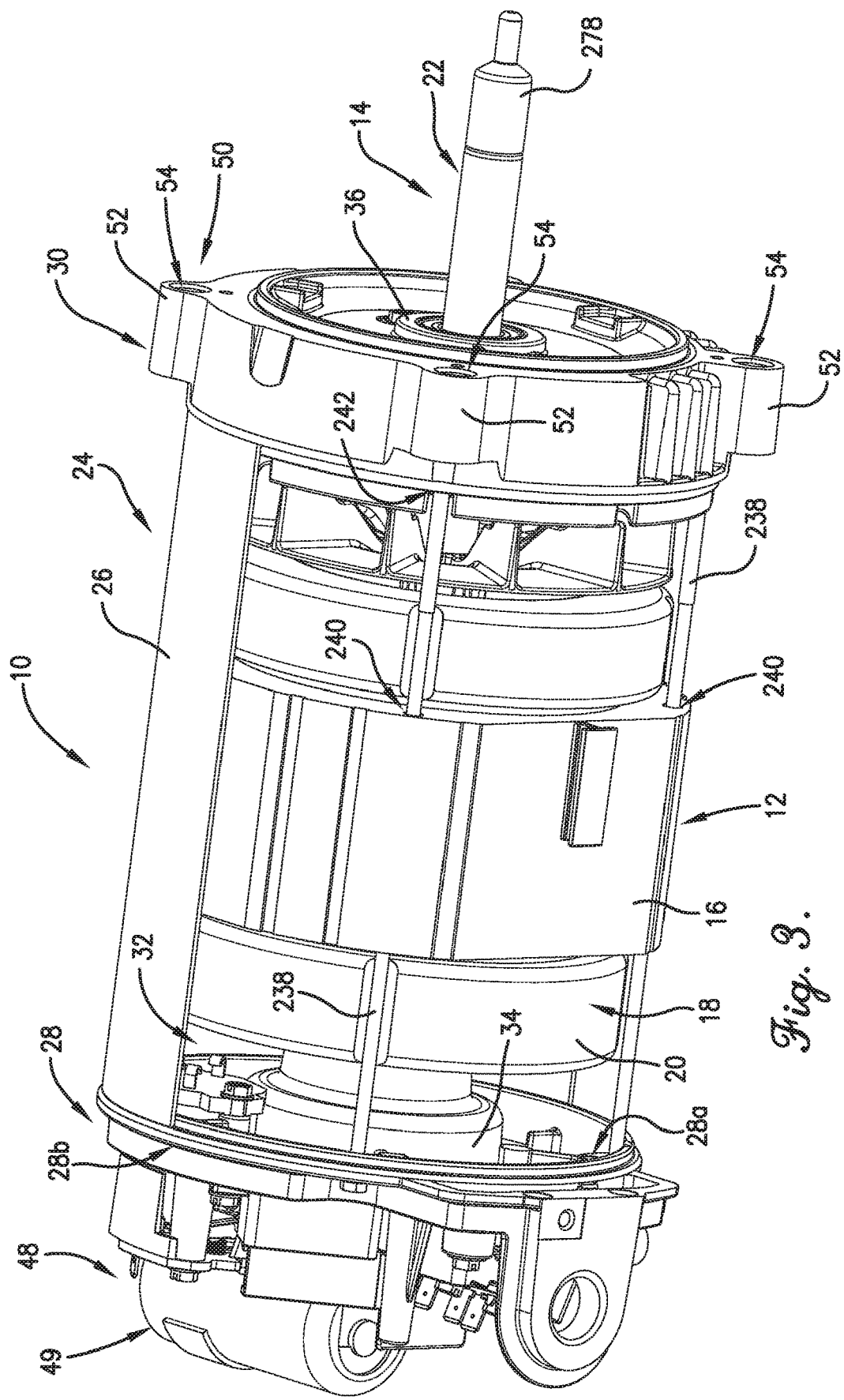
FIG. 3 is an enlarged, partially sectioned side perspective view of the motor of FIGS. 1 and 2, particularly illustrating the rotor and stator.
Figure 4:
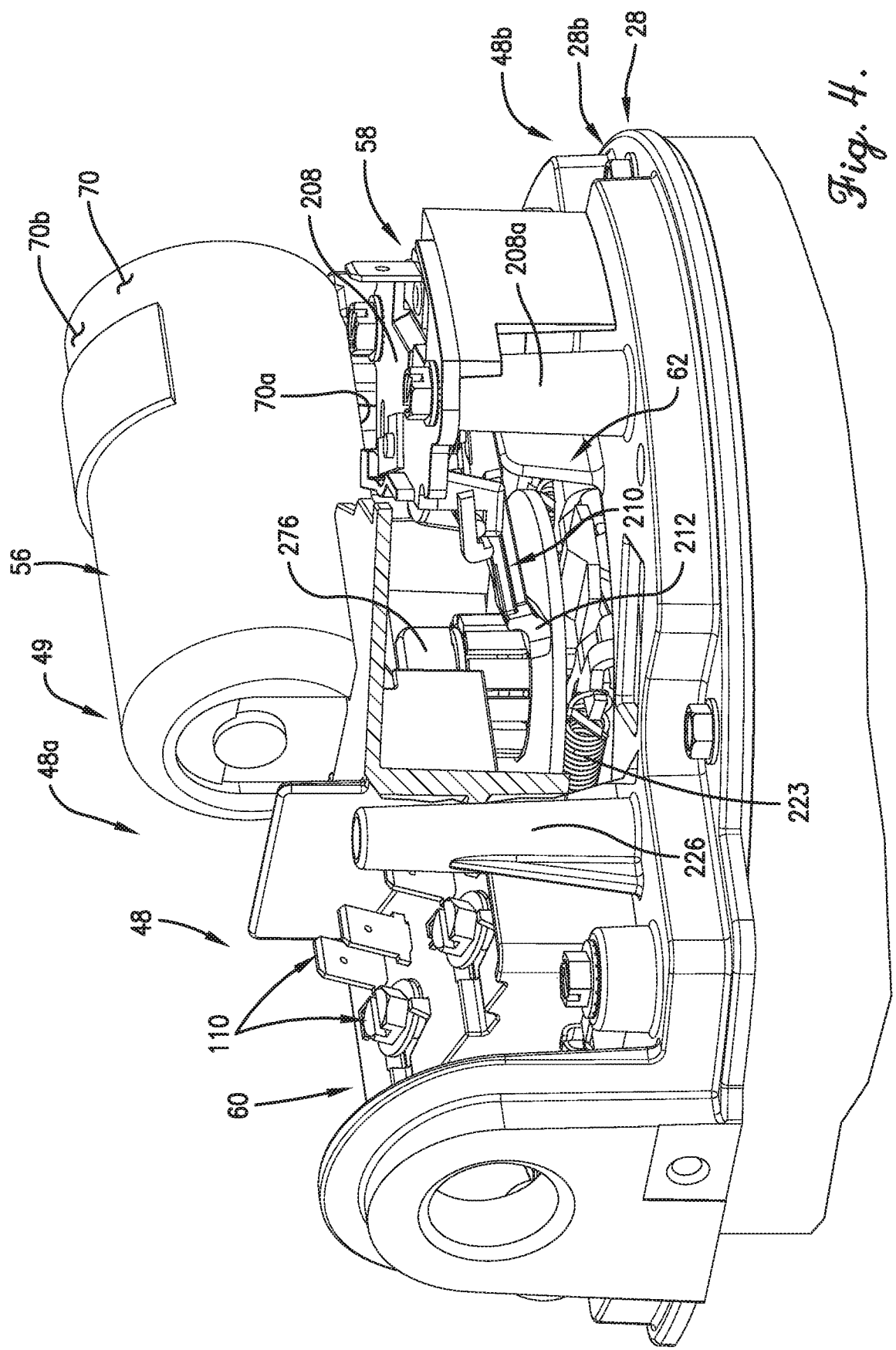
FIG. 4 is an enlarged, partially sectioned perspective view of the lead end of the motor of FIGS. 1-3 with the cover removed, particularly illustrating the lead-end endshield, the capacitor, the terminal board assembly, and the start switch assembly in a lowered position.
Figure 5:
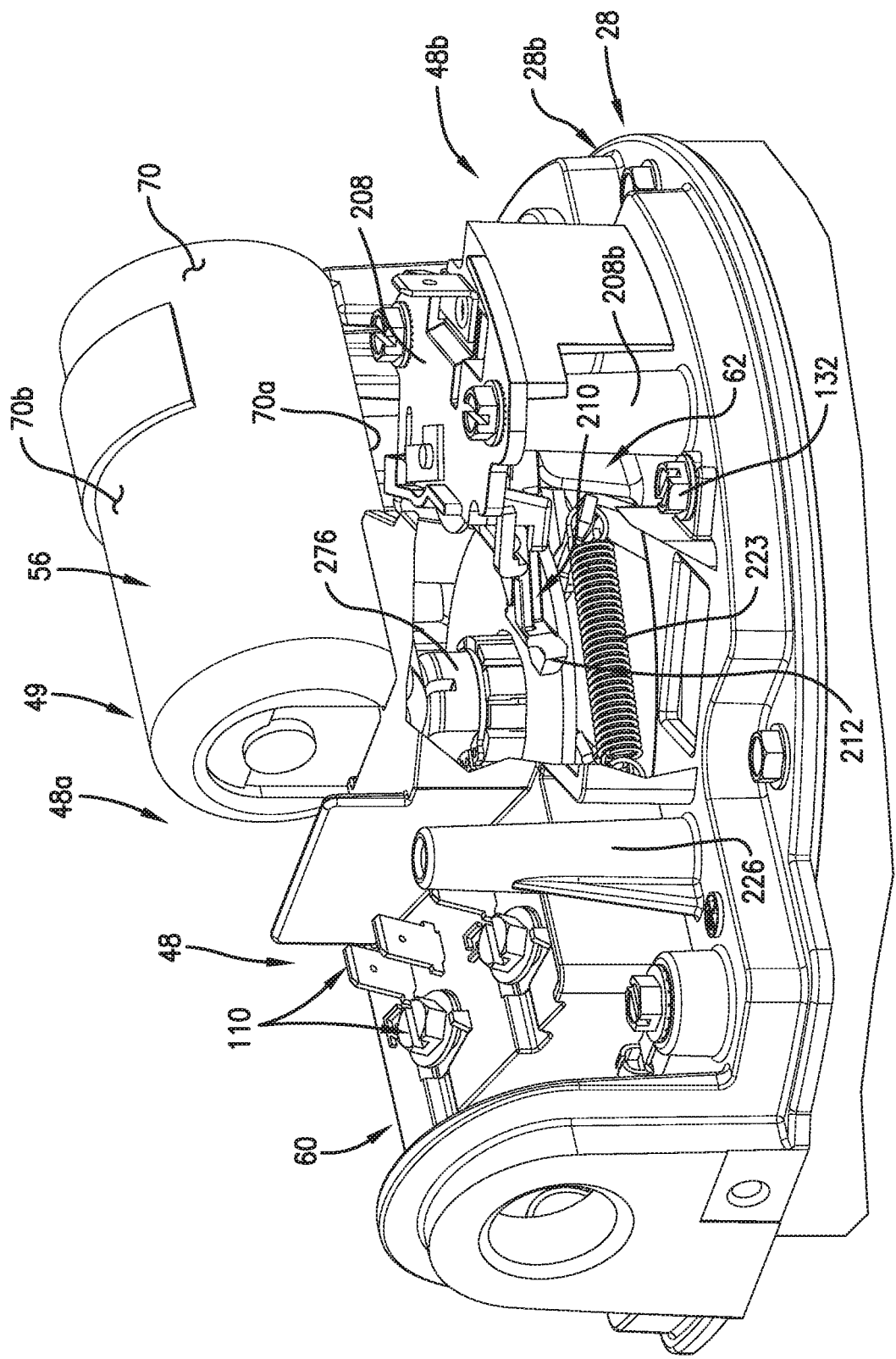
FIG. 5 is an enlarged, partially sectioned perspective view of the lead end of the motor of FIGS. 1-4, largely similar to that of FIG. 4, but particularly illustrating the lead-end endshield, the capacitor, the terminal board assembly, and the start switch assembly in a raised position.
Figure 6:
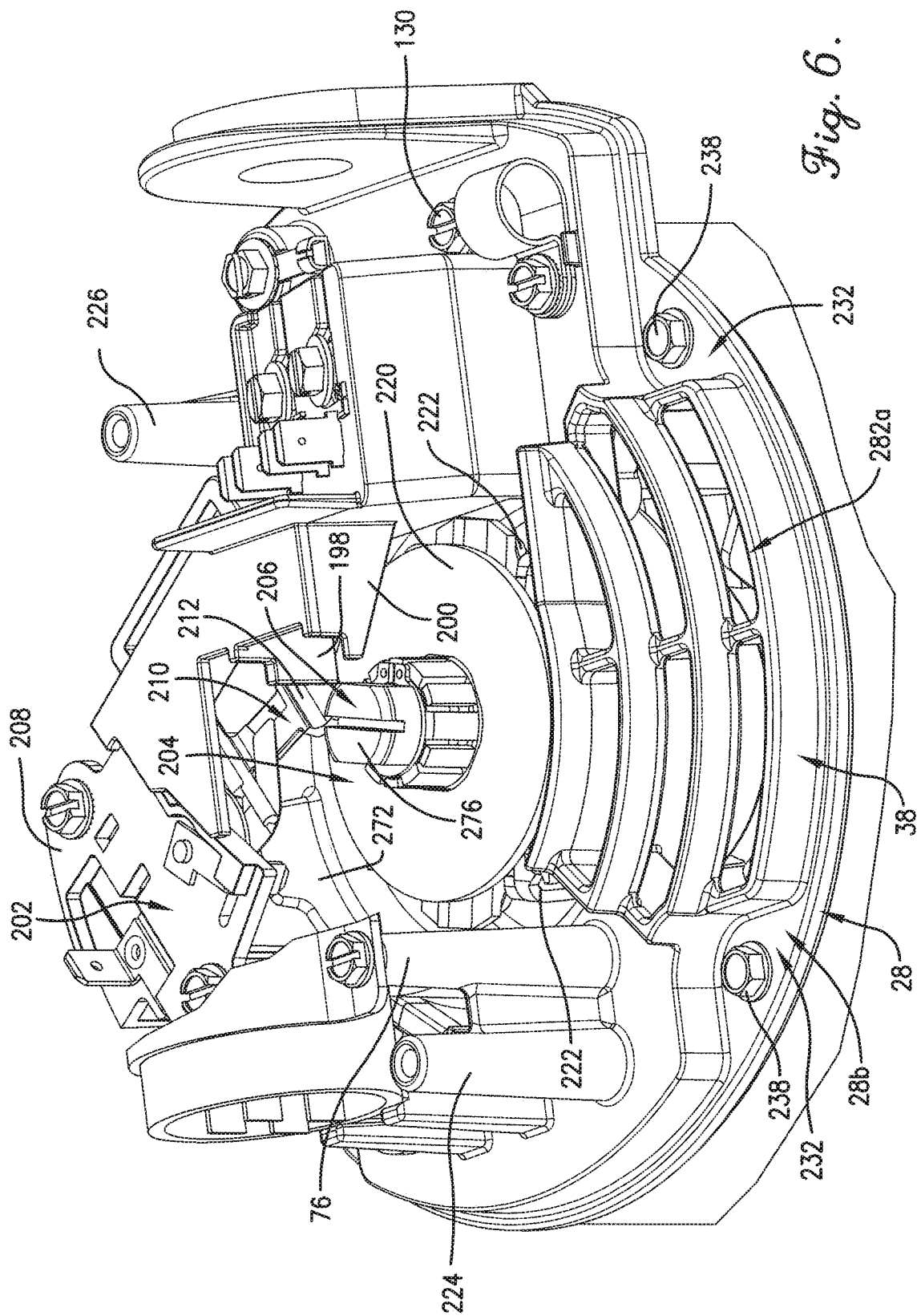
FIG. 6 is an enlarged, partially sectioned perspective view of the lead end of the motor of FIGS. 1-4, from a vantage point largely opposite that of FIGS. 4 and 5, particularly illustrating the structural shielding of the switch arm of the switch assembly.
Figure 7:
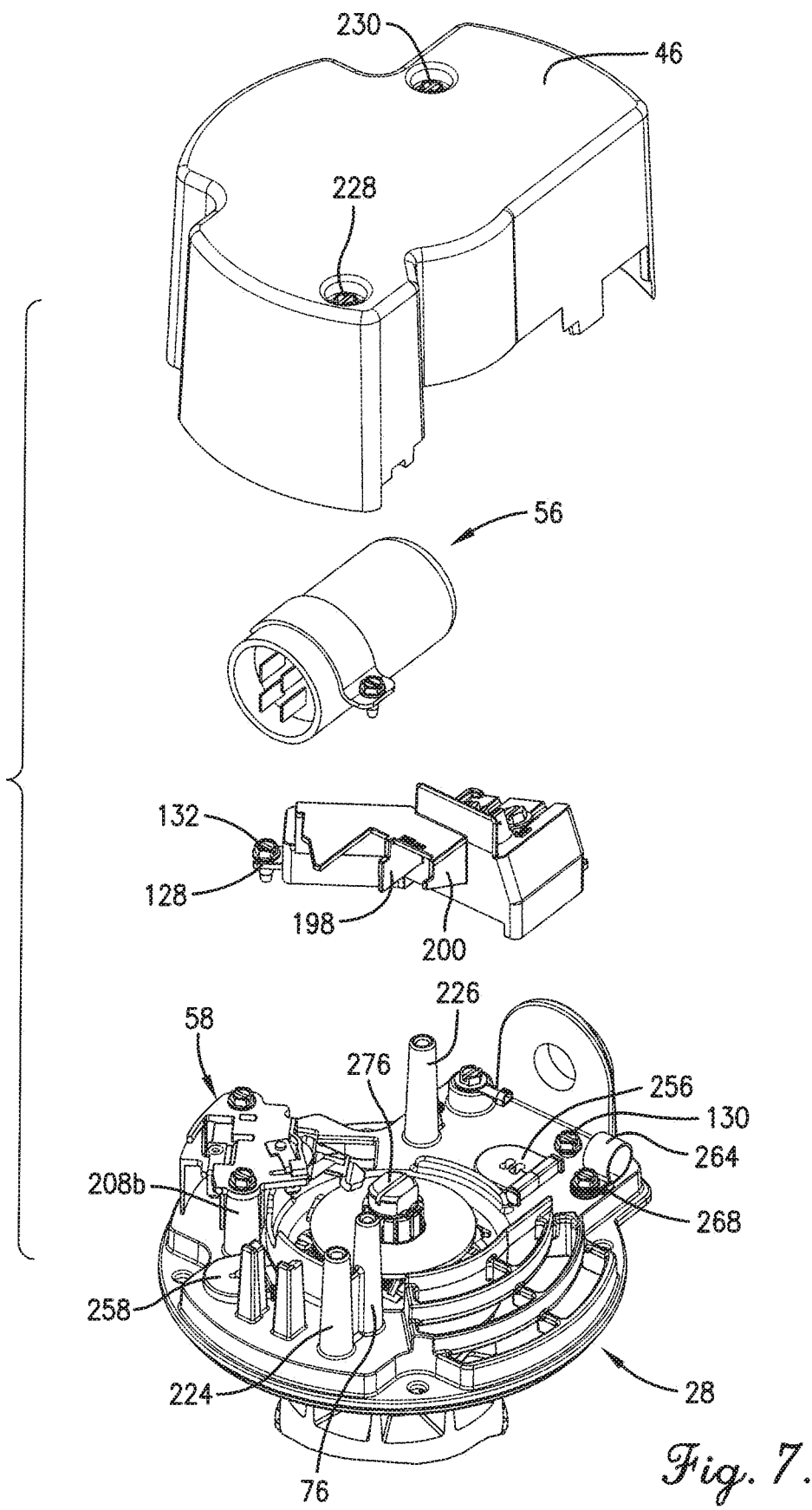
FIG. 7 is an exploded perspective view of the lead end of the motor of FIGS. 1-6.
Figure 8:
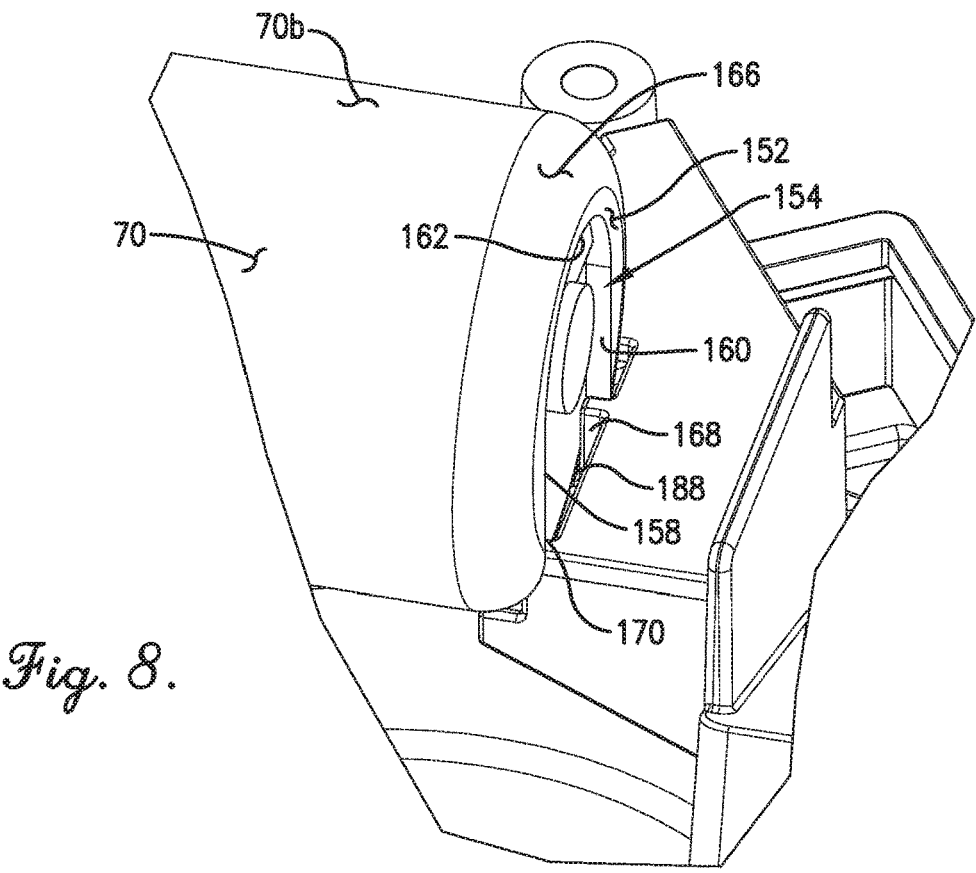
FIG. 8 is a greatly enlarged perspective view of the interface between the terminal board assembly and the capacitor of the motor of FIGS. 1-7.
Figure 9:
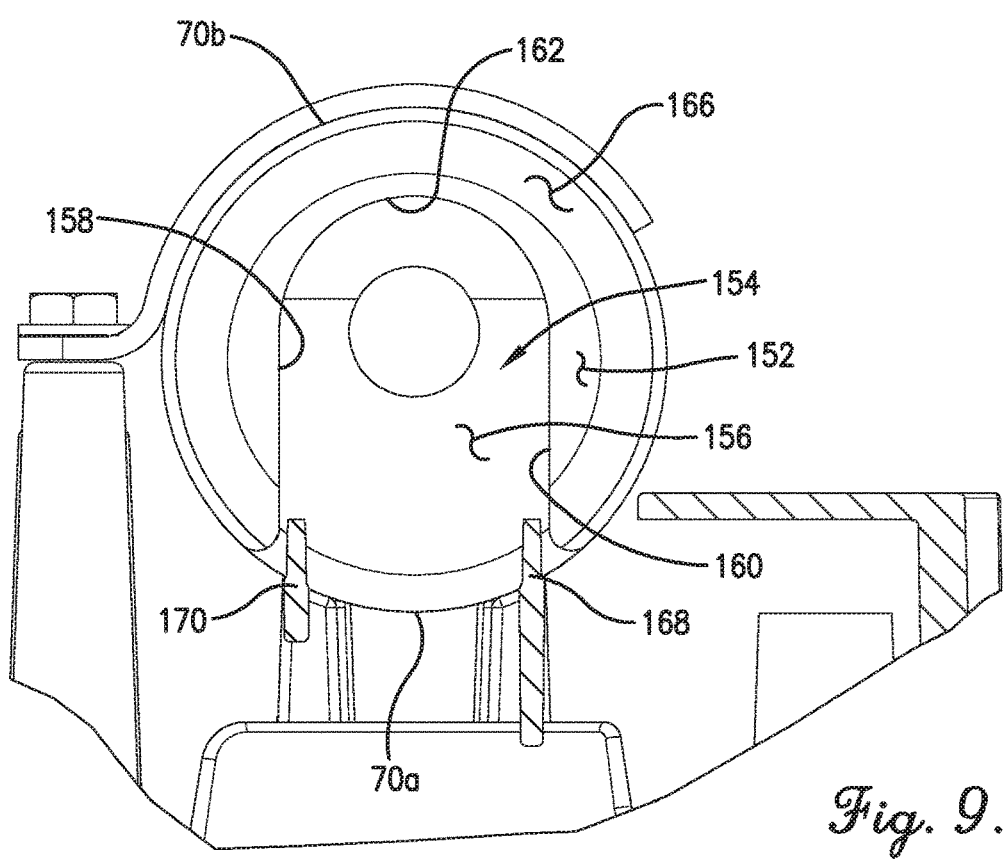
FIG. 9 is a greatly enlarged, partially sectioned elevational view of the interface between the terminal board assembly and the capacitor of the motor of FIGS. 1-8.
Figure 10:
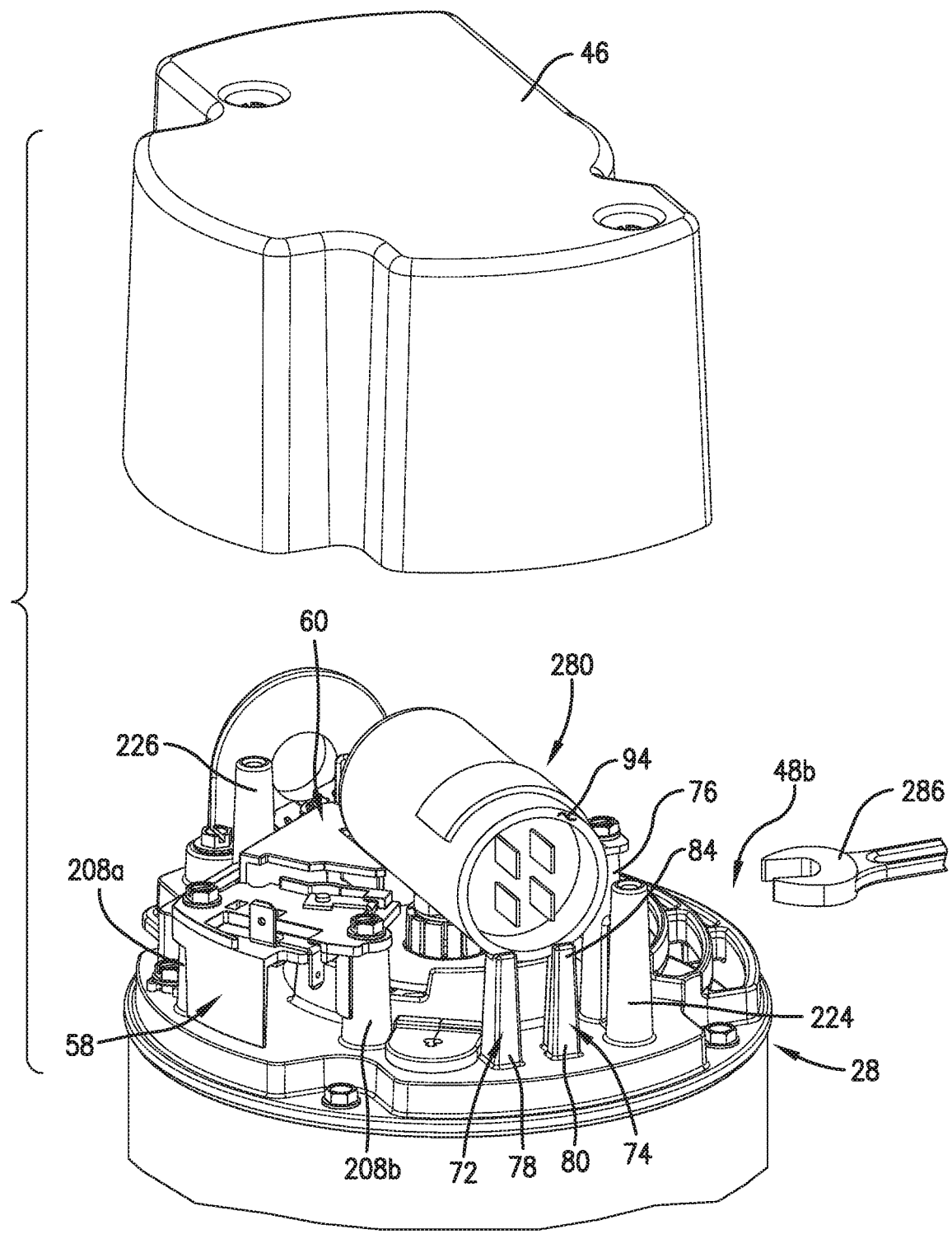
FIG. 10 is a partially exploded perspective view of the lead end of the motor of the motor of FIGS. 1-9, particularly illustrating a first tool access channel to the shaft.
Figure 11:
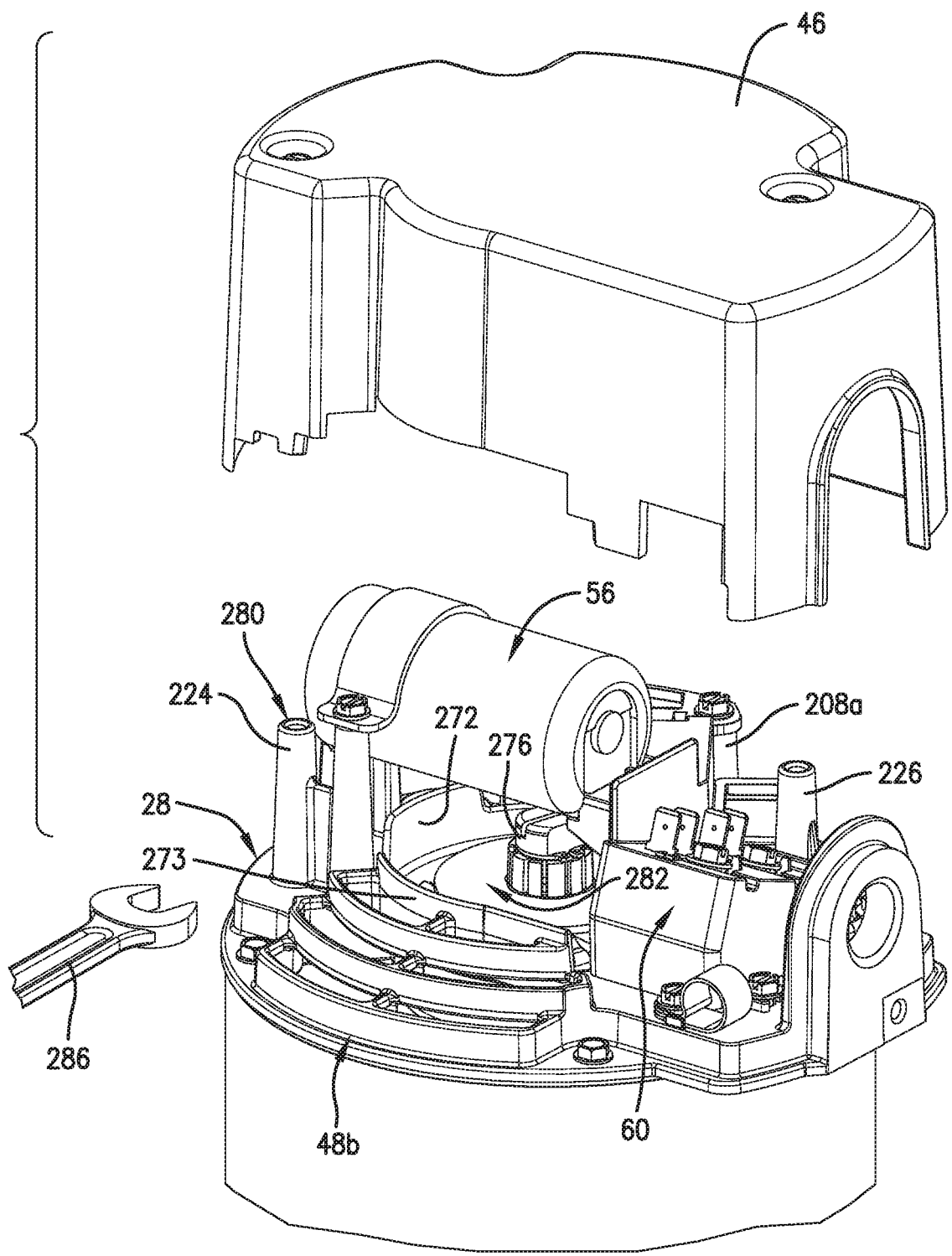
FIG. 11 is a partially exploded perspective view of the lead end of the motor of FIGS. 1-10, from a vantage point largely opposite that of FIG. 10, particularly illustrating the first tool access channel to the shaft.
Figure 12:
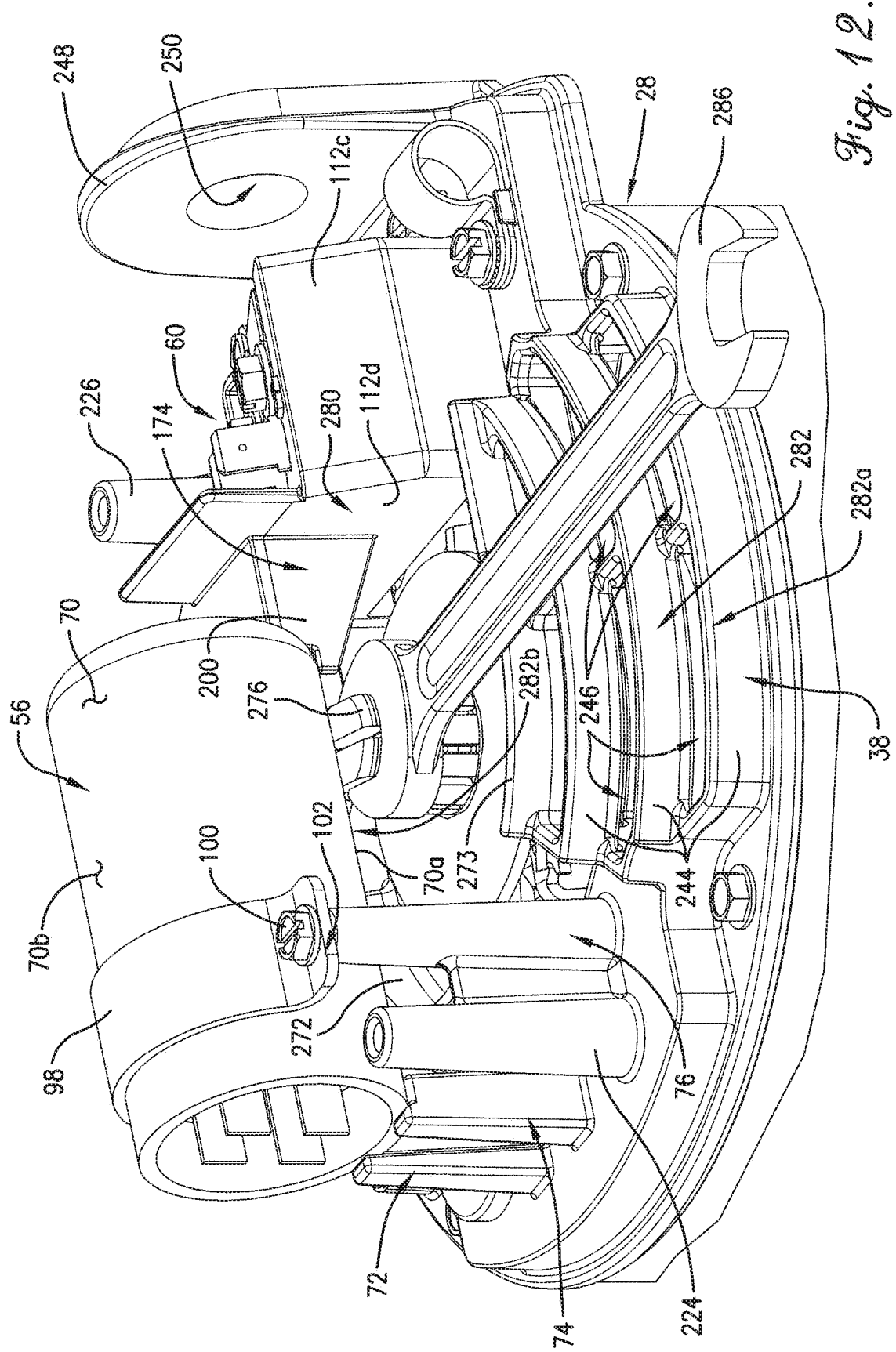
FIG. 12 is a perspective view of the lead end of the motor of FIGS. 1-11, particularly illustrating a wrench accessing the shaft via the first tool access channel.

With particular reference to FIGS. 12 and 28, which illustrate a wrench 286 engaging the shaft lead end 276, the first tool access channel 282 extends generally radially over the ventilation structure 38 and the wire-routing wall 273 to the shaft lead end 276, with the ventilation structure 38 and the wall 273 thus at least in part defining an axially inner margin 282a of the first tool access channel 282. The capacitor 56 at least in part defines an axially outer margin 282b of the first tool access channel 282. The capacitor boss 76 and the wire-routing wall 272 at least in part define a first arcuate or lateral margin 282c of the first tool access channel 282. The barrier walls 198 and 200 of the brackets 142 and 144 of the terminal board assembly 60, along with an intersection of the terminal board assembly walls 112c and 112, at least in part define a second arcuate or lateral margin 282d of the first tool access channel 282. The lead end 276 of the shaft 206 itself obstructs access to the switch arm 210 and, particularly, the actuating end 212, through at least certain portions of the first tool access channel 282.

In summary, the first tool access channel 282 is therefore preferably cooperatively at least in part defined by the ventilation structure 38, the inner surface 70a of the capacitor 56, the capacitor boss 76, the wire-routing walls 272 and 273, and the side 112d and brackets 142 and 144 of the terminal board assembly 60, which collaboratively prevent or at least substantially prevent an object or tool such as the illustrated wrench 286 (or screwdriver 288, as shown in FIG. 29) from deviating from the first tool access channel 282 when inserted therein.

As noted above, the lead end 276 of the shaft 206 itself obstructs access to the switch arm 210 and, particularly, the actuating end 212, through the first tool access channel 282. More particularly, in a preferred embodiment, the relative sizes and, in particular, the lateral dimensions, of the shaft lead end 276 and the actuating end 212 are such that substantial obstruction of access is possible. For instance, in a preferred embodiment, the actuating end 212 presents a maximum lateral actuator dimension. The shaft lead end 276 presents a minimum lateral shaft lead end dimension. The minimum lateral shaft lead end dimension is preferably at least about fifty (50) percent of the maximum lateral actuator dimension and more preferably at least about seventy-five (75) percent of the maximum lateral actuator dimension. Most preferably, the minimum lateral shaft lead end dimension is about equal to the maximum lateral actuator dimension. However, alternative relative sizing is permissible, provided sufficient restriction of direct tool access is nevertheless achieved.

Second Tool Access Channel

In the illustrated embodiment, the second tool access channel 284 preferably extends generally radially inwardly (e.g., from the radially outermost margin 48b of the electronics chamber 48) over the grommet 258 to the lead end 276 of the shaft 206. More particularly, the second tool access channel 284 preferably extends in a first generally radial direction. The switch arm 210 is preferably spaced radially outward of the shaft 206 in a second generally radial direction non-opposite the first generally radial direction. The second generally radial direction is angularly spaced from the first generally radial direction by an offset angle θ such that the shield structure 280 at least substantially restricts direct tool access to the switch arm 210 via the second tool access channel 284. That is, in a general sense, the second tool access channel 284 is oriented such that access to the switch arm 210 therethrough is angularly prevented or at least substantially restricted.

The offset angle θ is preferably between about five (5) degrees and about one hundred thirty-five (135) degrees and more preferably between about forty-five (45) degrees and about one hundred fifteen (115) degrees. Most preferably, the offset angle θ is about eighty (80) degrees.

It is noted that the second generally radial direction as discussed above is defined based on the radially closest portion of the switch arm 212 to the lead end 276. In a preferred embodiment, as illustrated, for instance, such direction is based on the disposition of the actuator end 212 relative to the lead end 276.

Figure 13:
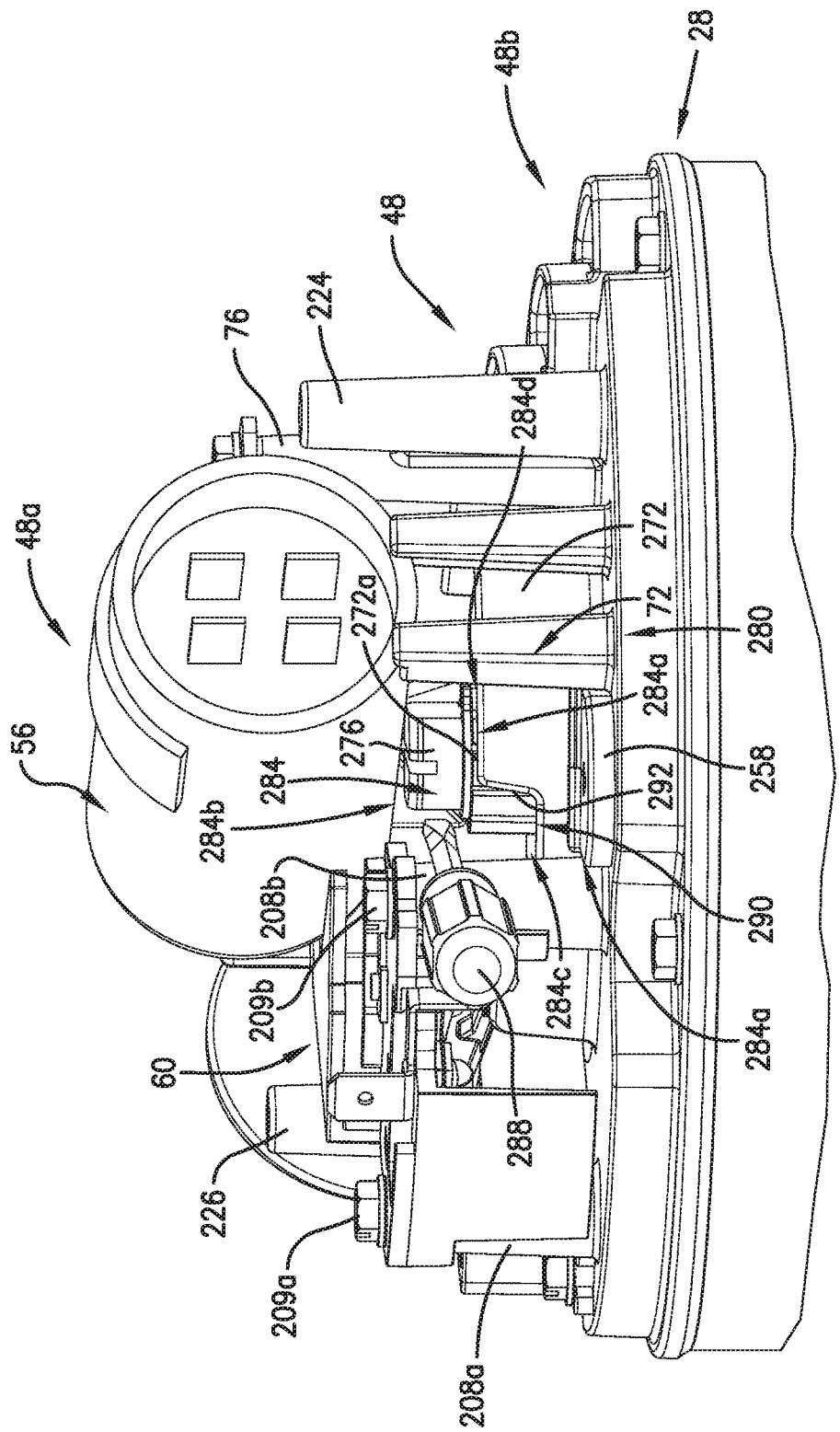
FIG. 13 is a perspective view of the lead end of the motor of FIGS. 1-12, particularly illustrating a second tool access channel to the shaft.
Figure 14:
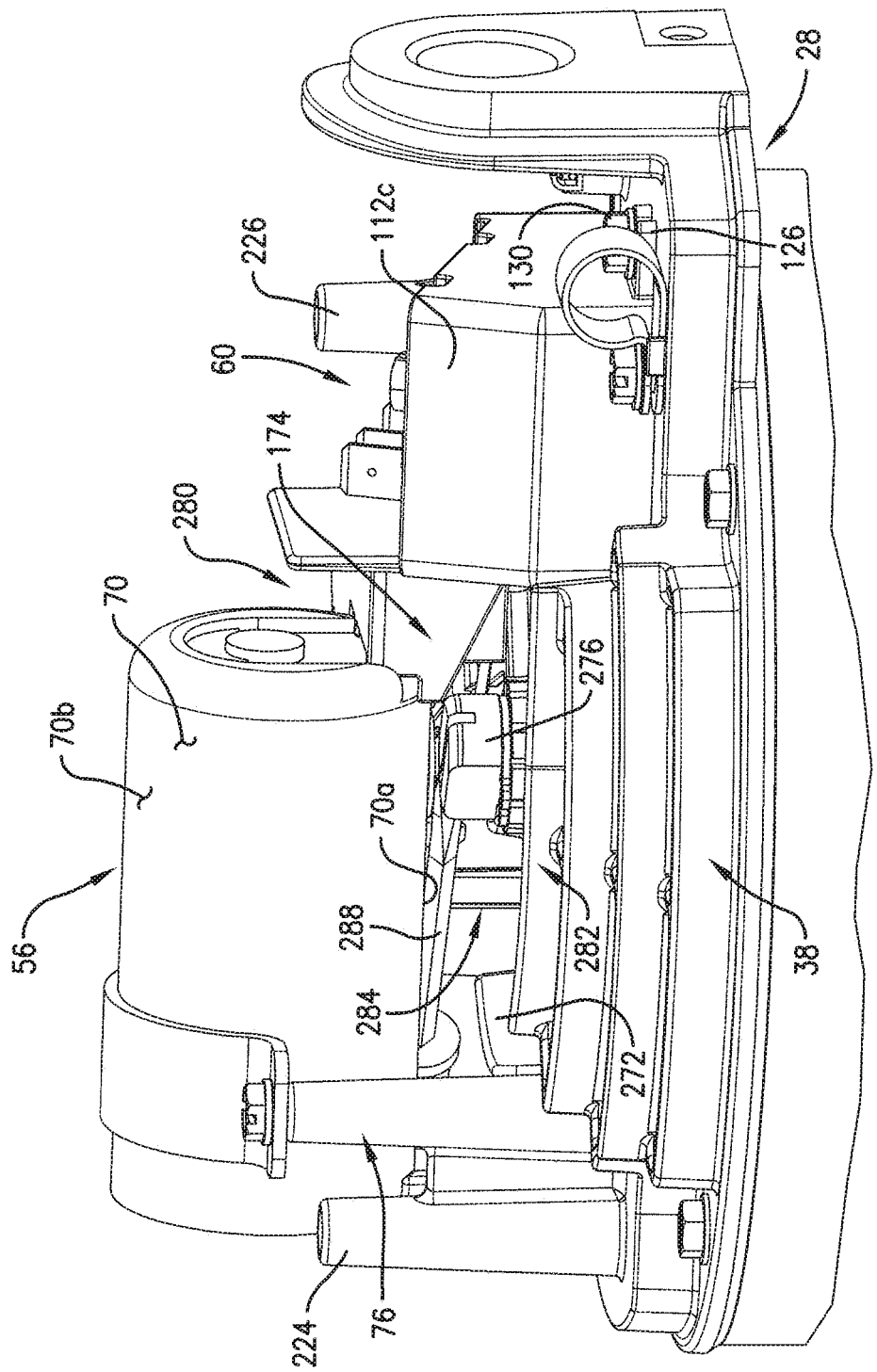
FIG. 14 is a perspective view of the lead end of the motor of FIGS. 1-13, particularly illustrating a screwdriver accessing the shaft via the second tool access channel.
Figure 15:
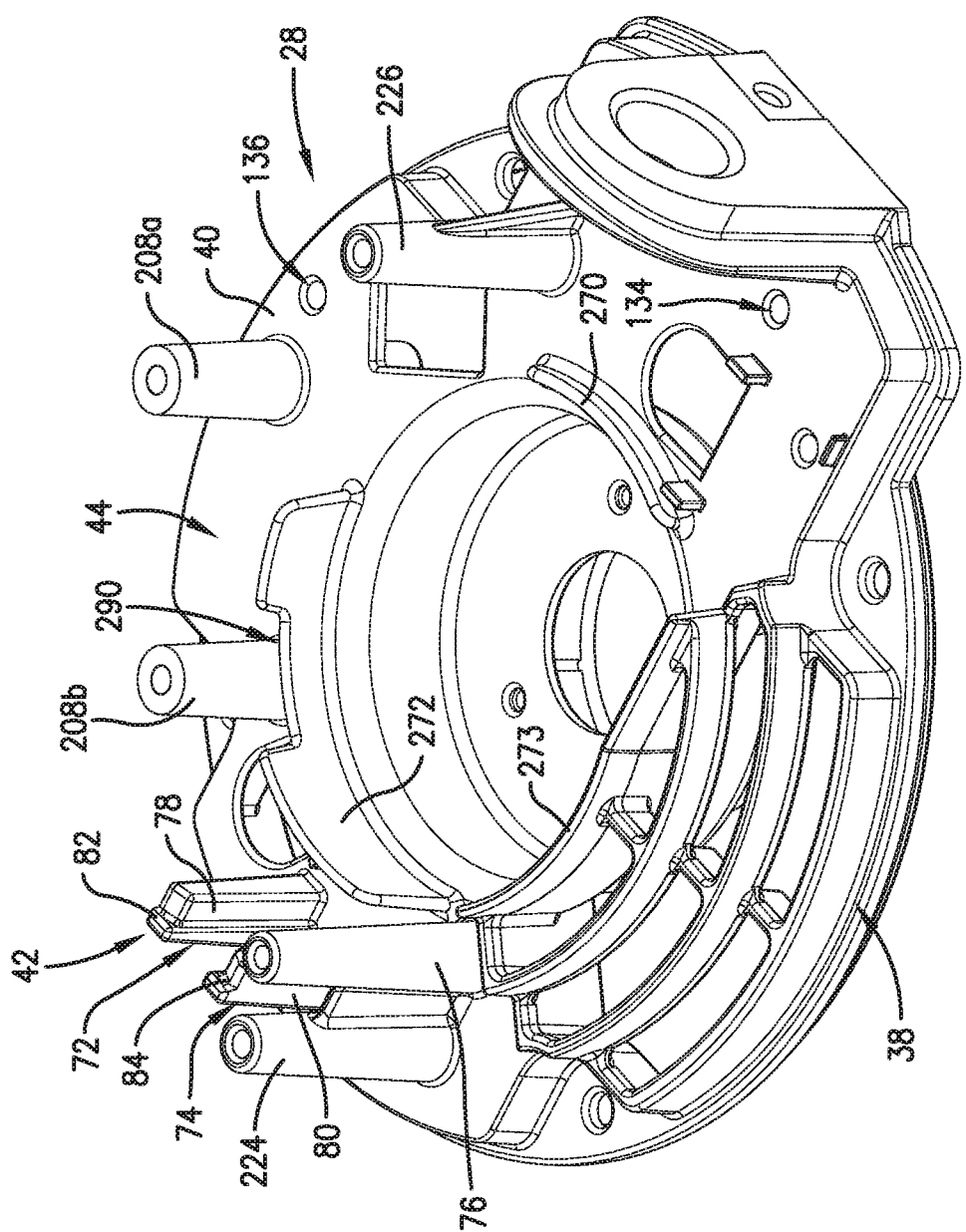
FIG. 15 is a perspective view of the lead-end endshield of the motor of FIGS. 1-14.

With particular reference to FIGS. 13 and 29, which illustrate a screwdriver 288 engaging the lead end 276, the second tool access channel 284 extends generally radially over the grommet 258 and the top edge 272*a* of the wire-routing wall 272, which thereby cooperatively at least in part define an axially inner margin 284*a* of the second tool access channel 284. The capacitor 56 (more particularly, the axially inner surface 70*a* thereof) and an overhanging portion of the outer wall 294 of the switch body 208 cooperatively at least in part define an axially outer margin 284*b* of the second tool access channel 284. The switch assembly boss 208*b* and the wire-routing wall 272 cooperatively at least in part define a first arcuate or lateral margin 284*c* of the second tool access channel 284. The capacitor support bracket 72 at least in part defines a second arcuate or lateral margin 284*d* of the second tool access channel 284.

The wall 272 includes a cutout 290 in part defined by an edge 292 of the wall 272. The cutout 290 is designed to further assist with lead routing. Preferably, tool access occurs axially outwardly from the cutout 290 (see for instance, the screwdriver 288 in FIG. 13), such that the edge 292 does not in part define the second lateral margin 284*d*.

In summary, the second tool access channel 284 is therefore preferably cooperatively at least in part defined by the grommet 258, the wire-routing wall 272, the inner surface 70*a* of the capacitor 56, the outer wall 294 of the switch body 208, the switch assembly boss 208*b*, and the capacitor support bracket 72.

Conclusion

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention.

What is claimed is:

1. A motor comprising:
    a stator;
    a rotor rotatable relative to the stator about an axis,
    said rotor including a shaft presenting a shaft lead end;
    an electrical component;
    said shaft lead end and said electrical component being disposed axially outward of the stator; and
    shield structure in part disposed axially outward of said electrical component to at least substantially restrict direct tool access to the electrical component from an axially outward position relative to the electrical component,
    said shield structure further at least in part defining a tool access channel extending to the shaft lead end, such that the shield structure enables direct tool access to the shaft lead end via the tool access channel,
    said shaft lead end being at least in part disposed between said tool access channel and said electrical component, such that the shaft lead end at least substantially restricts direct tool access to the electrical component via the tool access channel.

2. The motor as claimed in claim 1, further comprising:
    a cover at least in part defining an electronics compartment having a margin,
    said electronics compartment at least substantially receiving said electrical component and said shaft lead end,
    said tool access channel extending from the margin of the electronics compartment.

3. The motor as claimed in claim 1,
    said tool access channel extending radially inwardly to the shaft lead end.

4. The motor as claimed in claim 1,
    said shield structure at least in part including an electronic component configured to at least in part control motor operation.

5. The motor as claimed in claim 4,
    said electronic component being at least in part disposed axially outward of the electrical component.

6. The motor as claimed in claim 4,
    said shield structure further at least in part including at least one of an electronic component boss to which the electronic component is at least in part secured, a terminal board assembly, wire-routing structure, and ventilation structure.

7. The motor as claimed in claim 1,
    said shield structure at least in part including—
        an electronic component disposed axially outward of the electrical component and presenting axially opposed inner and outer surfaces,
        an electronic component boss to which the electronic component is at least in part secured,
        a terminal board assembly including a pair of electronic component support brackets at least in part supporting the electronic component,
        said terminal board assembly further including an axially extending sidewall from which the electronic component support brackets project,
        wire-routing structure including a generally arcuately extending, axially projecting wire-routing wall, and ventilation structure,
        said inner surface of the electronic component, said electronic component boss, said sidewall and electronic component support brackets, said wire-routing wall, and said ventilation structure cooperatively at least in part defining the tool access channel.

8. The motor as claimed in claim 1,
    said motor further comprising an endshield,
    said shaft projecting through said endshield,
    said electrical component being disposed axially between said endshield and said shield structure.

9. The motor as claimed in claim 1,
    said electrical component comprising a switch assembly operable to at least in part control an aspect of motor operation,
    said switch assembly including a switch arm shiftable between a first position and a second position.

10. The motor as claimed in claim 9,
said switch arm including an actuating end adjacent the shaft lead end,
said actuating end presenting a maximum lateral actuating end dimension,
said shaft lead end presenting a minimum lateral shaft lead end dimension,
said minimum lateral shaft lead end dimension being at least about 50% of said maximum lateral actuating end dimension.

11. The motor as claimed in claim 10,
said minimum lateral shaft lead end dimension being at least about 75% of said maximum lateral actuating end dimension.

12. The motor as claimed in claim 1,
said shield structure further at least in part defining a second tool access channel extending inwardly to the shaft lead end, such that the shield structure enables direct tool access to the shaft lead end via the second tool access channel,
said electrical component being spaced from the shaft in a second direction non-opposite the first direction,
said second direction being angularly spaced from the first direction by an offset angle such that said shield structure at least substantially restricts direct tool access to said electrical component via the second tool access channel.

13. A motor comprising:
a stator;
a rotor rotatable relative to the stator about an axis,
said rotor including a shaft presenting a shaft lead end;
an electrical component;
said shaft lead end and said electrical component being disposed axially outward of the stator; and
shield structure in part disposed axially outward of said electrical component to at least substantially restrict direct tool access to the electrical component from an axially outward position relative to the electrical component,
said shield structure further at least in part defining a tool access channel extending inwardly to the shaft lead end in a first direction, such that the shield structure enables direct tool access to the shaft lead end via the tool access channel,
said electrical component being spaced from the shaft in a second direction non-opposite the first direction,
said second direction being angularly spaced from the first direction by an offset angle such that said shield structure at least substantially restricts direct tool access to said electrical component via the tool access channel.

14. The motor as claimed in claim 13,
said offset angle being between about 5 degrees and about 135 degrees.

15. The motor as claimed in claim 14,
said offset angle being between about 45 degrees and about 115 degrees.

16. The motor as claimed in claim 15,
said offset angle being about 80 degrees.

17. The motor as claimed in claim 13, further comprising:
a cover at least in part defining an electronics compartment having a margin,
said electronics compartment at least substantially receiving said electrical component and said shaft lead end,
said tool access channel extending from the margin of the electronics compartment.

18. The motor as claimed in claim 13,
said first direction and said second direction each being generally radial.

19. The motor as claimed in claim 13,
said shield structure at least in part including an electronic component configured to at least in part control motor operation.

20. The motor as claimed in claim 19,
said electronic component being at least in part disposed axially outward of the electrical component.

21. The motor as claimed in claim 19,
said shield structure further at least in part including at least one of a generally axially projecting electronic component support column at least in part supporting the electronic component, an electrical component boss at least in part supporting the electrical component, and wire-routing structure.

22. The motor as claimed in claim 13,
said shield structure at least in part including—
an electronic component disposed axially outward of the electrical component and presenting axially opposed inner and outer surfaces,
a generally axially projecting electronic component support column at least in part supporting the electronic component,
wire-routing structure including a pass-through grommet and a generally arcuately extending, axially projecting wire-routing wall, and
an electrical component boss at least in part supporting the electrical component,
said inner surface of the electronic component, said pass-through grommet, said wire-routing wall, and said electrical component boss cooperatively at least in part defining the tool access channel.

23. The motor as claimed in claim 13,
said motor further comprising an endshield,
said shaft projecting through said endshield,
said electrical component being disposed axially between said endshield and said shield structure.

24. The motor as claimed in claim 13,
said electrical component comprising a switch assembly operable to at least in part control an aspect of motor operation,
said switch assembly including a switch arm shiftable between a first position and a second position.

* * * * *